United States Patent [19]

Tsukamoto et al.

[11] Patent Number: 5,140,360

[45] Date of Patent: Aug. 18, 1992

[54] CAMERA HAVING A ZOOM LENS SYSTEM

[75] Inventors: Takeya Tsukamoto; Hiroshi Ootsuka; Masatoshi Itoh; Nobuo Hasimoto, all of Osaka, Japan

[73] Assignee: Minolta Camera Kabushiki Kaisha, Osaka, Japan

[21] Appl. No.: 778,742

[22] Filed: Oct. 18, 1991

Related U.S. Application Data

[63] Continuation of Ser. No. 437,842, Nov. 17, 1989, abandoned.

[30] Foreign Application Priority Data

| Nov. 17, 1988 | [JP] | Japan | 63-150345 |
| Nov. 17, 1988 | [JP] | Japan | 63-150346 |
| Nov. 17, 1988 | [JP] | Japan | 63-150347 |
| Nov. 17, 1988 | [JP] | Japan | 63-292168 |
| Nov. 18, 1988 | [JP] | Japan | 63-151119 |
| Nov. 18, 1988 | [JP] | Japan | 63-151120 |
| Nov. 18, 1988 | [JP] | Japan | 63-151121 |
| Nov. 18, 1988 | [JP] | Japan | 63-151122 |

[51] Int. Cl.⁵ .............................. G03B 7/08
[52] U.S. Cl. .................... 354/430; 354/195.12
[58] Field of Search ............... 354/400–409, 354/195.12, 430; 358/906

[56] References Cited

U.S. PATENT DOCUMENTS

| 4,145,732 | 3/1979 | Pandres, Jr. | 354/195.12 |
| 4,445,757 | 5/1984 | Enomoto et al. | 354/195.12 |
| 4,719,485 | 1/1988 | Shikaumi | 354/400 |
| 4,786,987 | 11/1988 | Fujimura et al. | 354/409 |
| 4,825,237 | 4/1989 | Hatase et al. | 354/195.12 |
| 4,843,456 | 6/1989 | Iida et al. | 358/29 |
| 4,870,439 | 9/1989 | Tsuboi et al. | 354/195.12 |

FOREIGN PATENT DOCUMENTS 61-282811 12/1986 Japan.
62-118328 5/1987 Japan.
63-174477 7/1988 Japan.

Primary Examiner—L. T. Hix
Assistant Examiner—David M. Gray
Attorney, Agent, or Firm—Burns, Doane, Swecker & Mathis

[57] ABSTRACT

A camera comprises a taking lens having a zoom lens system, zoom lens driver for performing a zooming operation by driving the taking lens, first parameter detector for detecting a subject distance from a photographing scene, second parameter detector detecting light source data from the photographing scene, and controlling circuit for controlling the zoom lens driver so that the taking lens has a focal length automatically obtained on the basis of the subject distance and the light source data. The camera gives a photographer in advantage when, for example, a baby is photographed in the whole image plane at a relatively short distance indoors, or a subject such as the whole body of a child on a ground is photographed in the whole image plane at a relatively long distance outdoors.

22 Claims, 18 Drawing Sheets

Fig. 21
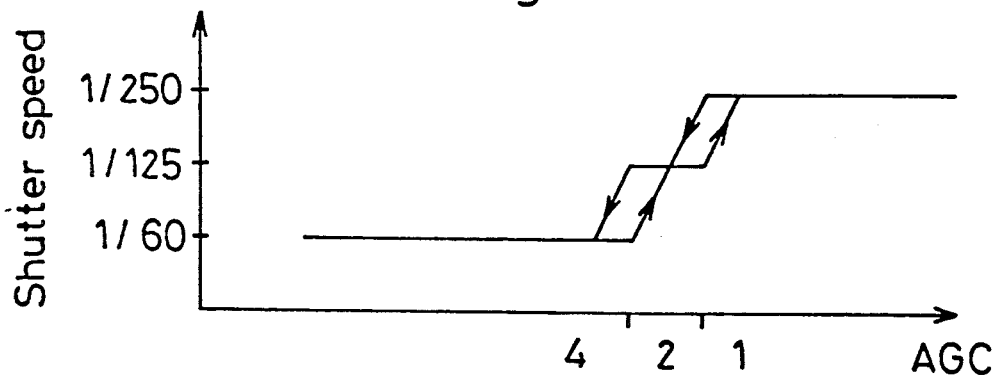
Fig. 22
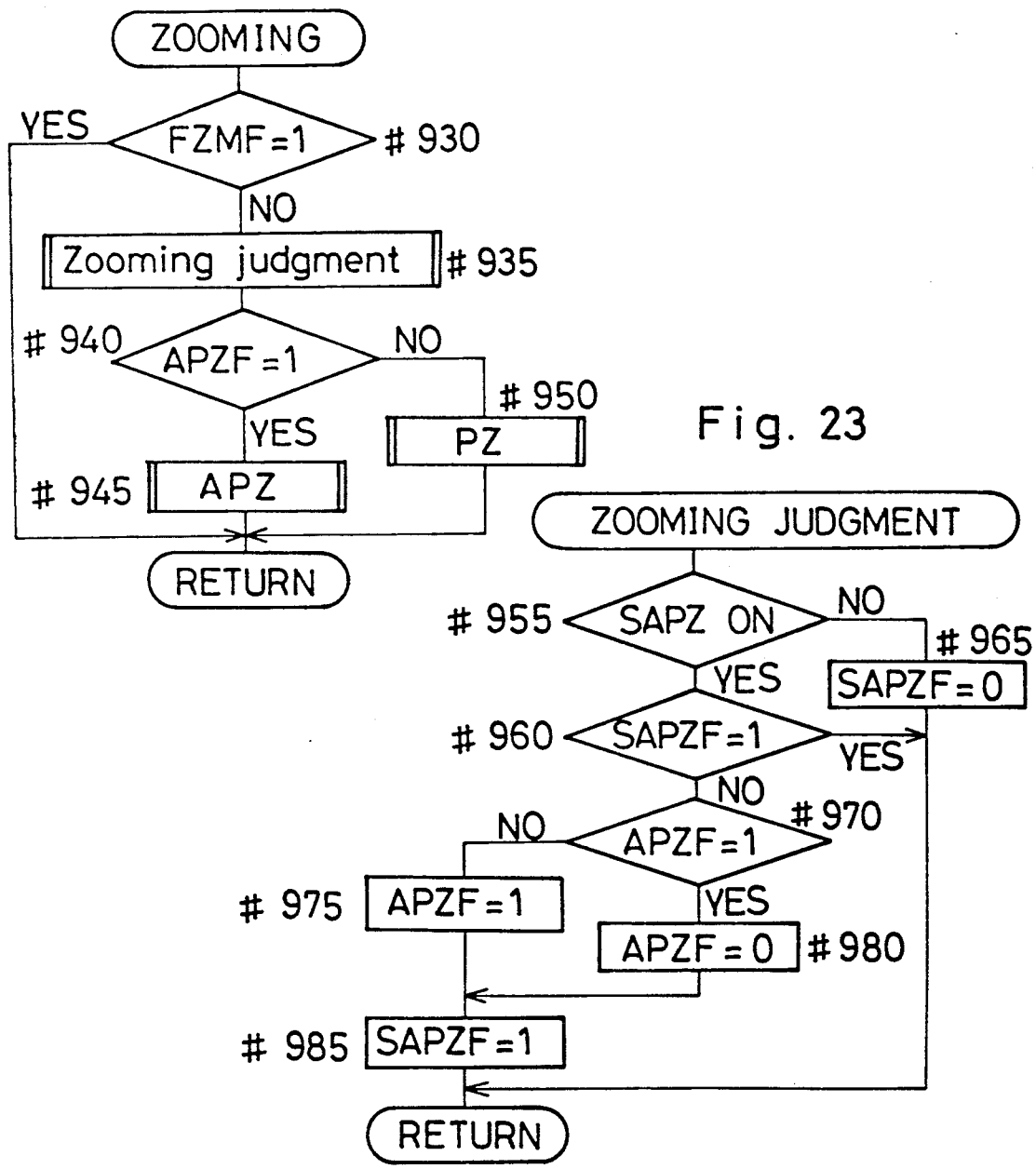
Fig. 23

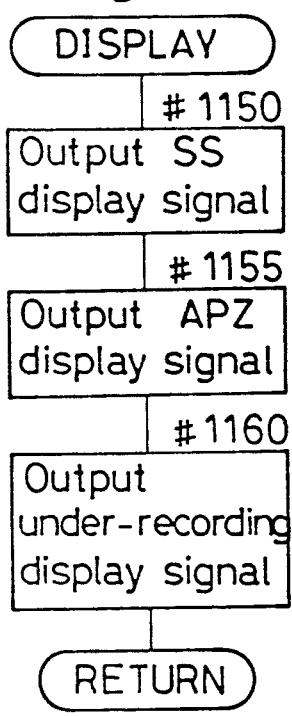
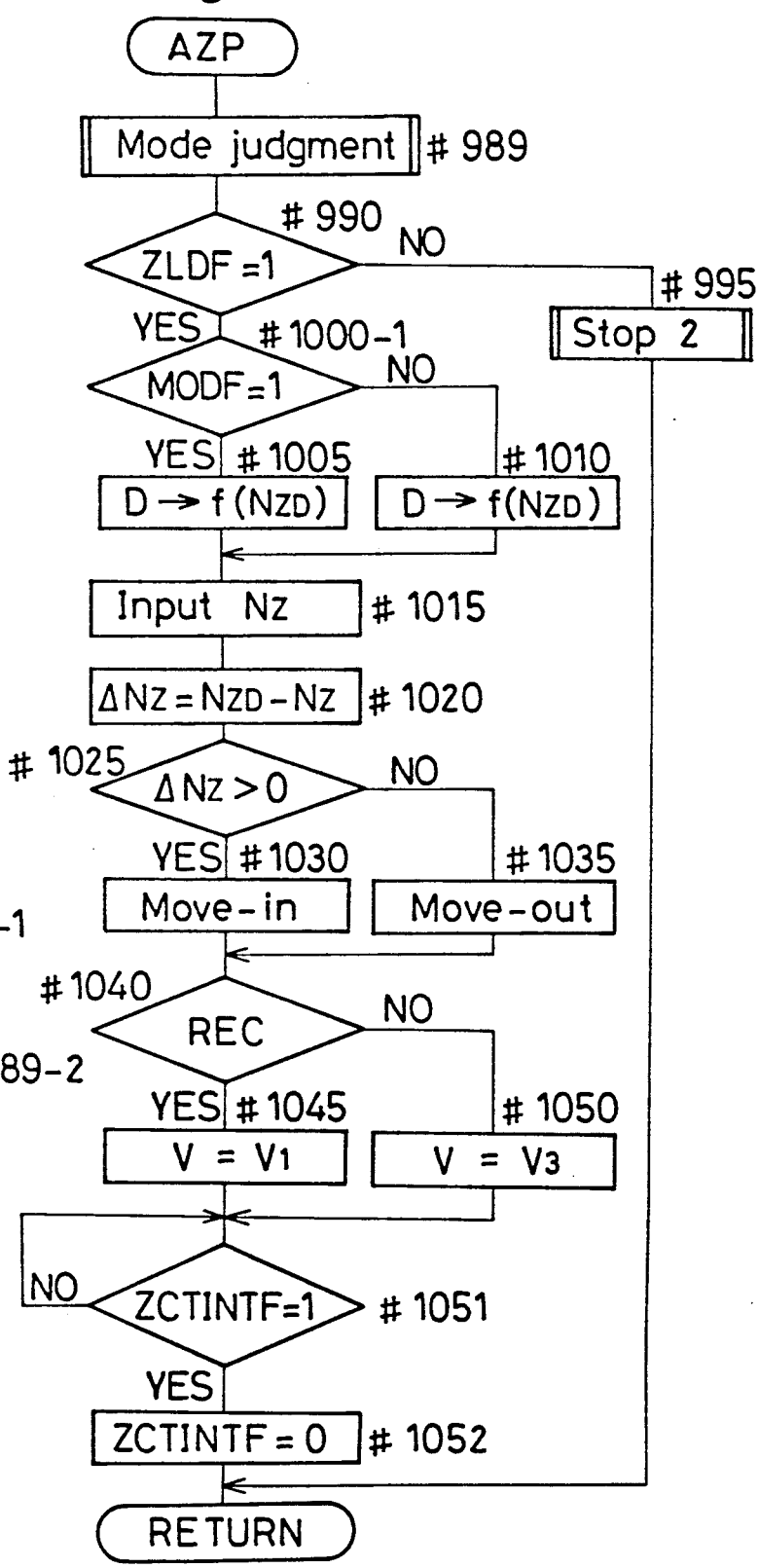
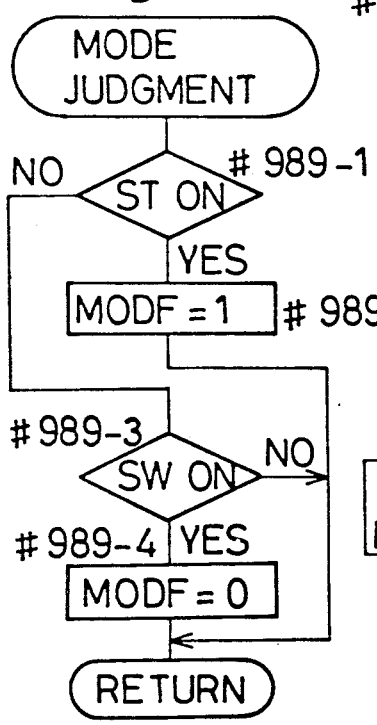

CAMERA HAVING A ZOOM LENS SYSTEM

This application is a continuation of application Ser. No. 07/437,842, filed Nov. 17, 1989, now abandoned.

BACKGROUND OF THE INVENTION

1. Field of the Invention

The present invention relates to a camera having a zoom lens system as a taking lens, and more specifically relates to a camera which controls a zooming or focusing operation of the taking lens in response to conditions of a photographing scene (i.e., a subject distance, a kind of a light source and so on) or a defocus amount of the taking lens respectively.

2. Description of the Prior Art

Conventionally, for example, in the case where a photographer wants to carry out zoom-photographing of a subject using a camera equipped with a zoom lens system, the photographing operation has been performed after a magnification is determined as he chooses by a photographer's manual zooming operation in such a manner as to operate a WIDE/TELE zooming driving button or a zoom ring. Therefore, a relatively long time has been required for the photographer's determination of the magnification. For this reason, a zoom photographing system called an automatic program zooming function has been proposed which automatically determines the magnification in response to the subject distance and automatically controls a focal length so that the determined magnification can be obtained.

However, according to the conventional automatic program zooming function, the relation between the subject distance and the magnification is determined in advance by only one program diagram thereof, which gives a photographer a disadvantage when for example, a baby is photographed in the whole image plane at a relatively short distance indoors, or a subject such as the whole body of a child on a ground is photographed in the whole image plane at a relatively long distance outdoors.

Further, according to the above-described automatic program zooming function, it is designed that the zooming lens is capable of being driven in the whole zooming range at both the times of indoor photographing in which the zooming lens is frequently driven nearby the shortest focal length condition, and outdoor photographing in which it is frequently driven nearby the longest focal length condition. Accordingly, there is a drawback that unnecessary judgment, control and actions in accordance with whether the present photographing situation is indoor photographing or outdoor photographing are required to be performed.

Furthermore, in such conventional automatic program zooming function, the zoom control is performed even when the taking lens is in extreme out-of-focus state. Therefore, for example, in the case where the zoom lens system having a focusing function of an inner-focus type or a rear-focus type is adopted as the taking lens, it is made impossible to control the zooming operation with accuracy because the degree of the out-of-focus condition becomes higher, causing the zooming lens consisting of a variator and a compensator, for example, to be excessively driven or to be made unsteady.

On the other hand, a conventional camera having the following zoom lens system as the taking lens has been known: the zooming lens performs the zooming operation in the normal photographing distance range, while it is driven into the macro range by a motor in order to perform the focusing operation when the subject is positioned at a shorter distance than the shortest photographing distance in the normal photographing distance range.

According to the camera having such conventional constitution, when the position of the subject is shifted from the macro range to the normal photographing distance range, the focusing operation by the zooming lens is shifted to that of a normal focusing lens. That is, when the zooming lens reaches the zooming range from the macro range, the normal focusing lens performs the focusing operation in place of the zooming lens. However, at this time, it has been brought into question how the zooming operation by the zooming lens in the zooming range should be controlled, that is, how the focal length of the taking lens should be set.

Meanwhile, a conventional camera has been proposed on which velocity setting means is provided so that a photographer can set the drive velocity of the zooming lens in the zooming operation as he chooses.

However, the conventional camera thus constituted has produced a disadvantage in the case of the macro focusing operation by the zooming lens in that focusing accuracy is deteriorated if the drive velocity of the zooming lens is set high at zoom photographing by the velocity setting means. This is because accurate focusing operation is made difficult due to the high velocity, and especially in a power focusing mode, stable focusing operation becomes impossible to be performed.

Also in the case of a video camera, if the drive velocity of the zooming lens is set high by the velocity setting means, an angle of view is rapidly changed due to the high drive velocity, resulting in a reproduced picture image hard to be seen clearly.

SUMMARY OF THE INVENTION

It is an object of the present invention to provide a camera capable of controlling a focal length of a taking lens in response to such conditions of a photographing scene such as subject distance and the kind of a light source.

Another object of the present invention is to provide a camera capable of controlling the focal length of the taking lens on the basis of information on subject change obtained from a defocus amount and so on.

A further object of the present invention is to provide a camera having the taking lens by which either a focusing operation or a zooming operation is performed in two photographing distance ranges, for example, a normal photographing distance range and a macro photographing distance range respectively, which is capable of setting the focal length of the taking lens so as to have a suitable focal length when the photographing distance range is shifted from one to the other.

A further object of the present invention is to provide a camera having the taking lens by which either the focusing operation or the zooming operation is performed in the two photographing distance ranges, for example, the normal photographing distance range and the macro photographing distance range respectively, which is capable of controlling a moving velocity of lens groups of the taking lens to a velocity suitable for each photographing distance range.

A still further object of the present invention is to provide a camera, especially a video camera in this case, which is capable of obtaining a desired picture image even if the zooming operation is performed during recording.

In accordance with one feature of the present invention, the camera comprises means for detecting or judging such situations as the subject distance and the kind of the light source. The focal length of the taking lens is designed to be controlled on the basis of the detected or judged result.

In accordance with another feature of the present invention, the camera comprises means for detecting the subject change (i.e., the defocus amount). On the basis of the detected result, the zooming operation is designed to be inhibited when the subject is in extreme out-of-focus condition.

In accordance with a further feature of the present invention, the camera comprises the taking lens by which either the focusing operation or the zooming operation is performed in the two photographing distance ranges (i.e., the normal photographing distance range and the macro photographing distance range). In the case where the photographing distance range is returned to the first one after being shifted to the other one, the taking lens is so controlled as to have the focal length realized at the time of the first photographing distance range.

In accordance with another feature of the present invention, the camera comprises means for judging whether or not a recording operation is being performed at present. Thereby, the zooming velocity is varied in response to whether or not it is during recording or during non-recording.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIG. 21 is a program diagram regarding FIG. 20;

FIG. 22 is a flowchart showing a subroutine of a zooming mode;

FIG. 23 is a flowchart showing a zoom judgment subroutine;

FIG. 27 is a flowchart showing a subroutine of display;

FIG. 28 is a flowchart showing a subroutine of the automatic program zooming mode according to another embodiment of the present invention; and FIG. 29 is a flowchart showing a mode judgment subroutine in the flowchart shown in FIG. 28.

DETAILED DESCRIPTION OF THE PREFERRED EMBODIMENTS

Hereinafter, a video camera provided with a zoom lens system embodying the present invention will be explained with reference to the drawings.

Figure 1:
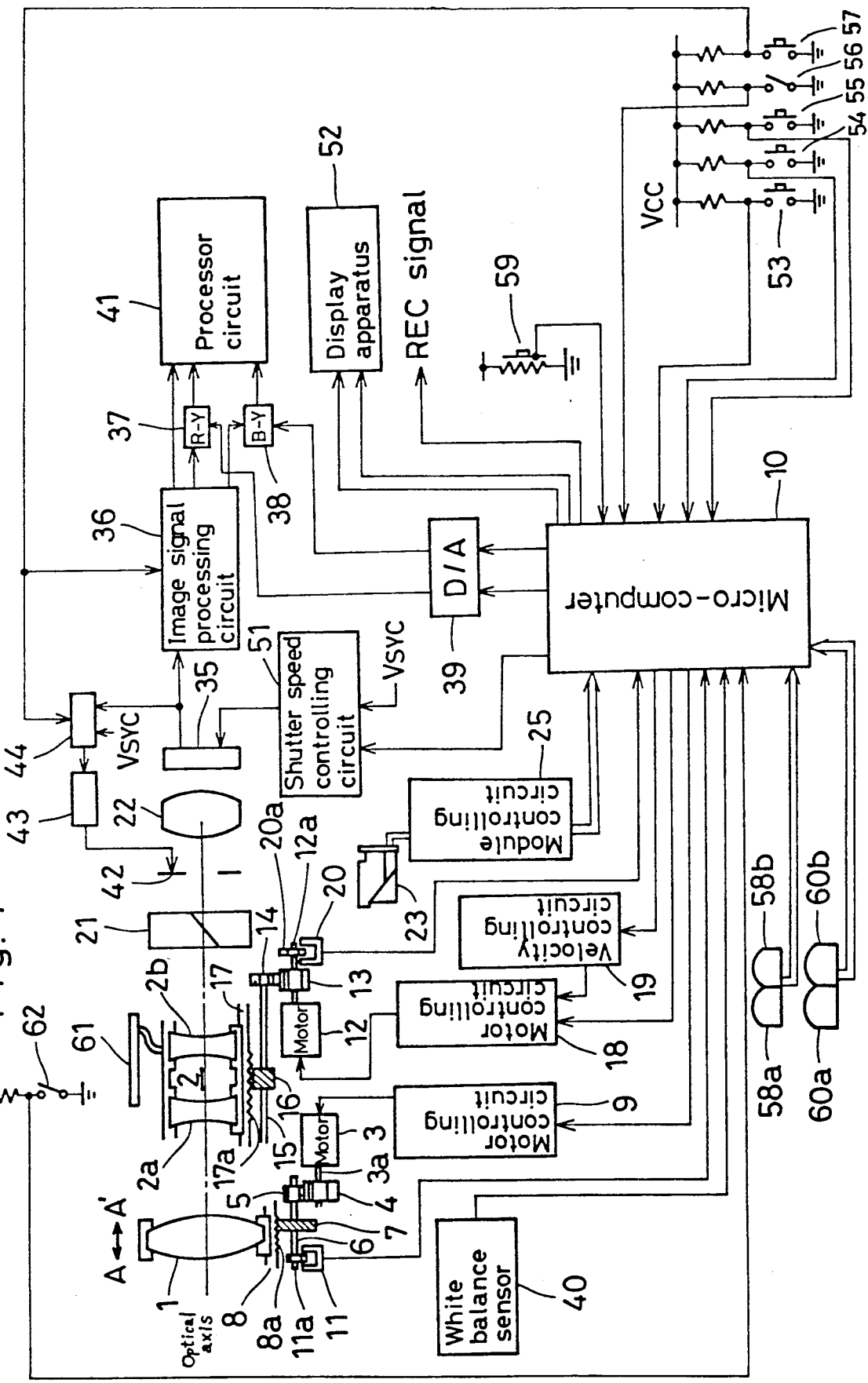
FIG. 1 is a structural view of the system according to the present invention.
Figure 2:
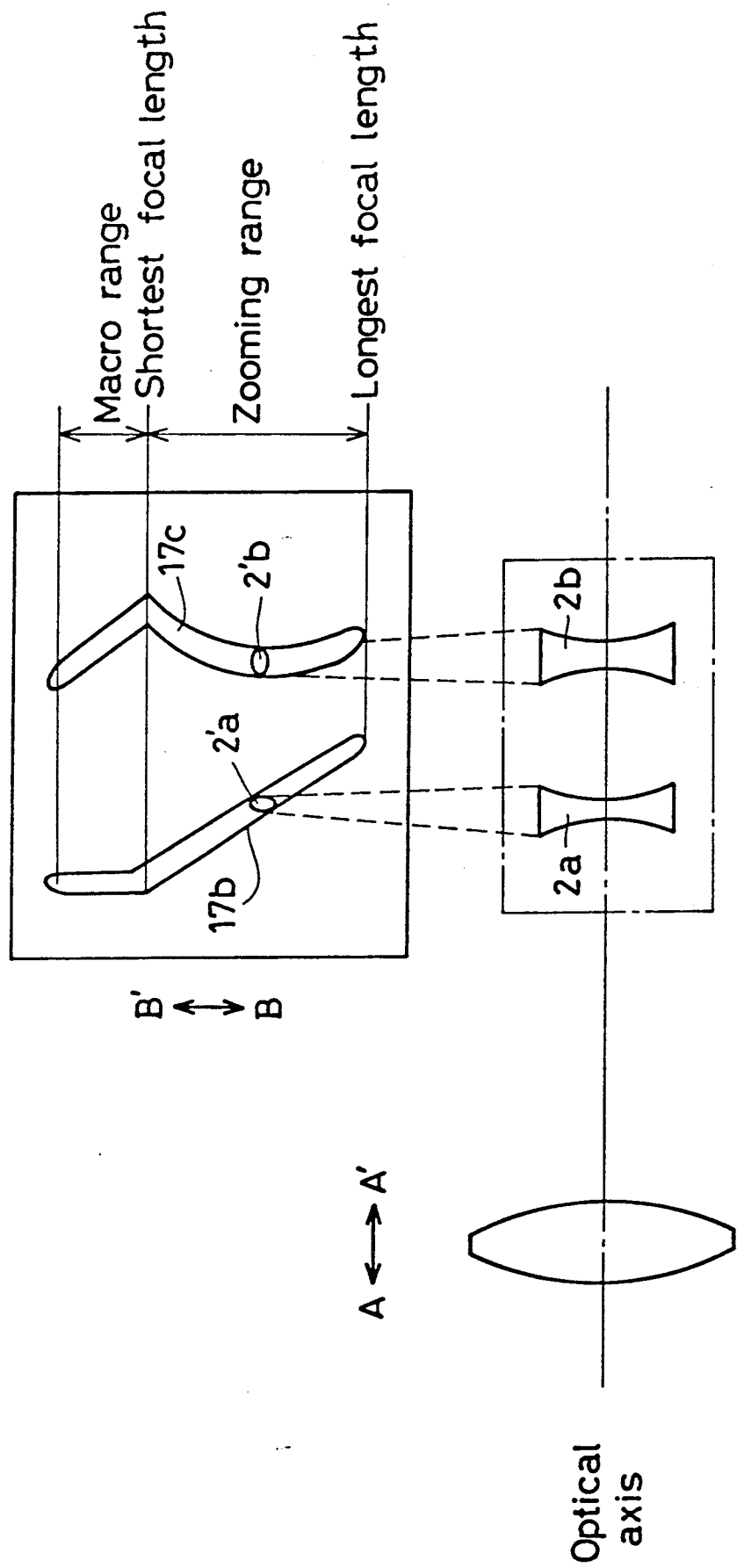
FIG. 2 is a view showing a lens drive range of the zooming lens group.
Figure 3:
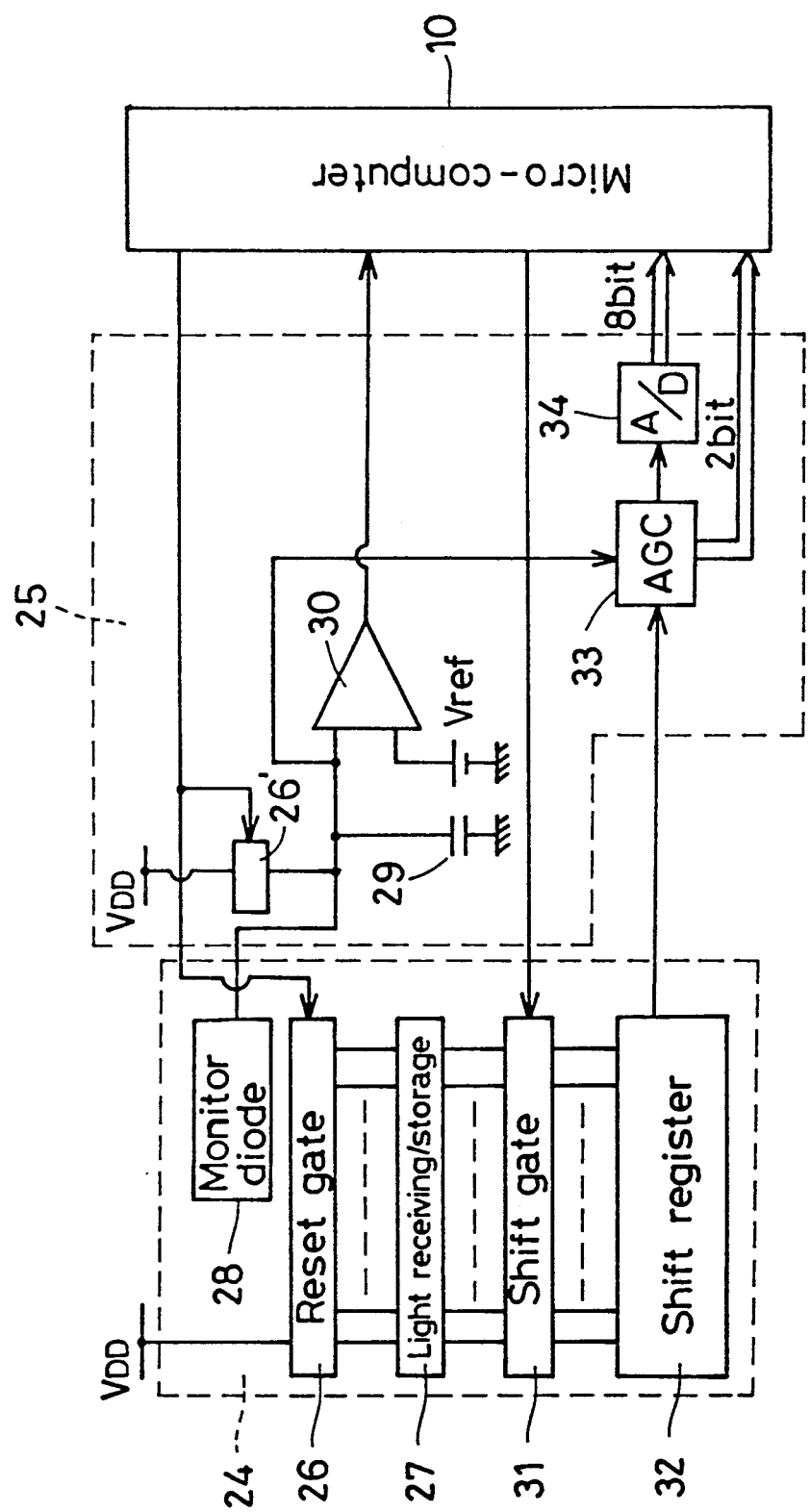
FIG. 3 is a view showing an example of a module controlling circuit.

In FIG. 1, Numeral 1 indicates a front lens group which carries out the focusing operation regarding the subject from the near side (for example, the subject distance is 1 m) to infinity. Numerals 2a and 2b indicate lens components of a zooming lens group 2 which carries out the zooming operation and the focusing operation at macro photographing, and the lens components 2a and 2b function as a variator and a compensator respectively in the zooming operation. Numeral 3 indicates a bi-directionally rotatable front lens driving motor which drives the front lens group 1 along an optical axis forward or backward (in the direction designated by an arrow A—A') in the focusing operation. Numerals 4, 5 and 7 indicate first, second and third change gears for transmitting the drive power of the front lens driving motor 3 to the front lens group 1 respectively, wherein the first change gear 4 rotates in a body with a rotating shaft 3a of the front lens driving motor 3, the second change gear 5 rotates in a body with a shaft 6 disposed along the optical axis on the front lens group 1 side while engaged with the first change gear 4, and the third change gear 7 rotates in a body with the shaft 6 in engagement with a helicoid gear part 8a formed on a lens-barrel 8 holding the front lens group 1. Numeral 9 indicates a motor controlling circuit for controlling the front lens driving motor 3 in response to a motor drive command signal sent from a micro-computer 10. Numeral 11 indicates a drive detection device which detects the drive of the front lens group 1 (in other words, rotation of the front lens driving motor 3) and generates drive pulses at regular intervals to be sent to the micro-computer 10 while the front lens group 1 is driven. The drive detection device 11 generates the pulses, for example, in a manner that rotation of a rotating plate 11a which rotates in a body with the shaft 6 is detected by a photo coupler. Numeral 12 indicates a bi-directionally rotatable zooming lens driving motor which drives the zooming lens components 2a and 2b along the optical axis thereof forward or backward (in the direction designated by the arrow A—A') in the zooming or the focusing operation in macro range. Numerals 13, 14 and 16 indicate fourth, fifth and sixth change gears for transmitting the drive power to the zooming lens components 2a and 2b, wherein the fourth change gear 13 rotates in a body with a rotating shaft 12a of the zooming lens driving motor 12, the fifth change gear 14 rotates in a body with a shaft 15 disposed along the optical axis on the zooming lens group 2 side while engaged with the fourth change gear 13 and the sixth change gear 16 rotates in a body with the shaft 15 in engagement with a helicoid gear part 17a formed on a lens-barrel 17 in which the zooming lens components 2a and 2b are slidably driven. In the lens-barrel 17, as shown in FIG. 2, cam slots 17b and 17c making combinations with drive pins 2'a and 2'b for holding the zooming lens components 2a and 2b in the lens-barrel 17 respectively are formed in order to drive the zooming lens components 2a and 2b. For example, when the lens-barrel 17 is rotated from the illustrated state in the direction designated by an arrow B, the drive pins 2'a and 2'b are shifted toward the shortest focal length condition to become for wide angle use. When the lens-barrel 17 is further rotated in the direction of the arrow B, the drive pins 2'a and 2'b are shifted from the normal zooming range into the macro range, thereby only the zooming lens component 2b is driven in the direction of the arrow A to perform the focusing operation at macro photographing. Numeral 18 indicates a motor controlling circuit for controlling the zooming lens driving motor 12 in response to the motor drive command signal from the micro-computer 10. Numeral 19 indicates a velocity controlling circuit which supplies a velocity control voltage to the motor controlling circuit 18 responding to a velocity command signal sent from the micro-computer 10 to vary the drive velocity of the zooming lens driving motor 12, i.e. the zooming lens components 2a and 2b corresponding to the velocity control voltage. For the velocity controlling circuit 19, an integration circuit may be employed in which a pulse modulation output supplied from the micro-computer 10 as the velocity command signal is integrated to produce an output voltage corresponding to a pulse width as the velocity control voltage. Numeral 20 indicates a drive detection device which detects the drive of the zooming lens components 2a and 2b (or the rotation of the zooming lens driving motor 12) and generates the drive pulses at regular intervals to be sent to the micro-computer 10 while the zooming lens components 2a and 2b are driven. The drive detection device 20 is, for example, designed to detect the rotation of a rotating plate 20a, which rotates in a body with the driving shaft 12a, by means of the photo coupler for generating the pulses. Numeral 21 indicates a half prism, which introduces a part of a light flux having passed through the front and zooming lens groups 1 and 2 to a focus condition detecting module as described later, and leads the remainder of the light flux into a master lens group as described later. Numeral 22 indicates the master lens group for forming the light flux from the half prism 21 into an image on a charge coupled device (hereinafter, referred to as "CCD") of an image processing system. Numeral 23 indicates the focus condition detecting module which prepares information on focus condition based on the light flux from the half prism 21 and converts it into an electric signal, and it actuates when a shutter release button is half depressed after the subject is adjusted to be entered in a focus frame in the center of a viewfinder. The focus condition detecting module 23 consists of an optical system such as a separator lens for optically preparing the information on focus condition based on the light flux from the half prism 21, and a CCD 24 for photoelectric-converting this information into the electric signal. The CCD 24, which is shown in FIG. 3, includes a light receiving part and a storage part for accumulating charges corresponding to the amount of light emitted on the light receiving part, and so on. Numeral 25 indicates a module controlling circuit which sends each command signal from the micro-computer 10 to the focus condition detecting module 23 and also sends back the focus condition detection signal obtained from the focus condition detecting module 23 to the micro-computer 10 after conversion into a digital signal. FIG. 3 concretely shows the constitution of the module controlling circuit 25. First, when the shutter release button is half depressed, a focus condition detection start signal is sent from the micro-computer 10 to a reset gate 26 of the CCD 24 through the module controlling circuit 25, thereby the charges previously accumulated in a light receiving/storage part 27 of the CCD 24 are reset once for starting a new focus condition detection. Thus, the light receiving/storage part 27 receives the information on focus condition optically prepared in the optical system of the focus condition detecting module 23 and starts the accumulation of the charges. At this time, control of the amount of the accumulated charges (i.e. control of the charge accumulation time) is performed based on the output of a monitor photo diode 28 disposed in the vicinity of the CCD 24. To put it more concretely, a part of the information on focus condition to be inputted in the CCD 24 is inputted also in the monitor photo diode 28, and the charges corresponding to the received light amount are accumulated in a capacitor 29. Further, when the amount of the accumulated charges is larger than a reference voltage Vref (determined as a value of a sufficient amount of the charges accumulated in the light receiving/storage part 27), an output signal of a comparator 30 is inverted to be sent out to the micro-computer 10 as an integration end signal. Inputting the signal, the micro-computer 10 sends out a transfer command signal for transferring the charges (focus condition signal) accumulated in the light receiving/storage part 27 through the module controlling circuit 25. Thereafter, the focus condition signal based on the charges accumulated in the light receiving/storage part 27 of the CCD 24 are sent through the shift gate circuit 31 to a shift register 32, which sends out the inputted focus condition signal to an automatic gain controlling circuit (hereinafter, referred to as "AGC circuit") 33 of the module controlling circuit 25 after parallel/series conversion. Here, in order to prevent the accuracy in the focus condition signal from deteriorating due to a subject luminance, the AGC circuit is designed to automatically alter an amplifying ratio for amplifying the focus condition signal sent from the shift register 32 corresponding to the amount of the charges accumulated in the capacitor 29 by the monitor photo diode 28. Thereafter, the focus condition signal amplified in the AGC circuit 33 is sent to the micro-computer 10 after conversion into a 8-bit digital signal in an analog-digital converter (hereinafter, referred to as "A/D converter") 34. Thus, in the micro-computer 10, on the basis of the digital-converted focus condition signal, the focusing direction and the amount of defocus is calculated by adding lens information obtained from the zoom lens system. In addition thereto, for example, in the case of the focusing operation by means of the drive of the front lens group, the corresponding rotational direction and amount of rotation of the front lens driving motor 3 is calculated and sent to the motor drive controlling circuit 9 as the motor drive command signal.

The amplifying ratio obtained at every focus condition detection in the AGC circuit 33 is equivalent to luminance information of the subject because it varies corresponding to the amount of the charges accumulated in the capacitor 29 by the monitor photo diode 28, therefore the amplifying ratio is sent to the micro-computer 10 also as an AGC signal after conversion into a 2-bit digital signal so as to be utilized in setting a shutter speed command signal in an automatic exposure mode. Furthermore, in consideration of the case where the charges can not be sufficiently accumulated in the capacitor 29 by the monitor photo diode 28 because of lack of the subject luminance at starting the focus condition detection, a timer which is actuated from the time of the input of the focus condition detection start signal for a predetermined time is provided in the micro-computer 10 for the purpose of not producing such a disadvantage that the integration end signal is not outputted from the comparator 30 to the micro-computer 10. If the integration end signal is not inputted during actuation of the timer, the micro-computer 10 forcedly falls into the state equivalent to the input state of the integration end signal, and thereby the charges accumulated in the capacitor 29 by the monitor photo diode 28 are designed to be reset by a reset gate 26' every time the focus condition detection start signal is sent from the micro-computer 10.

Numeral 35 indicates a CCD for receiving the light flux for the image information having passed through the master lens group 22 and for photoelectric-converting it into the electric signal. In the present embodiment, it supposes that ½ inch type CCD is used in the CCD 35. The image signal obtained through the photoelectric conversion by the CCD 35 is sent out to an image signal processing circuit and a diaphragm controlling circuit as described later. Numeral 36 indicates the image signal processing circuit which processes the image signal sent from the CCD 35 for separating into a luminance signal Y, color difference signals R-Y and B-Y. Numerals 37 and 38 indicate a R-Y variable gain controlling circuit and a B-Y variable gain controlling circuit, respectively, which adjust the level of the respective color difference signals separated from each other in the image signal processing circuit 36 for white balance adjustment. Into each of the variable gain controlling circuits 37 and 38, a white balance adjustment control signal is sent from the micro-computer 10 through a D/A converter 39 on the basis of measured output from a white balance sensor 40 disposed on the front part of an exterior body of the video camera, which measures a color temperature of a light source emitting light toward the subject. Numeral 41 indicates a processor circuit for generating an NTSC-type image signal of a color television through the process of synchronization of the color difference signals adjusted for desirable white balance in the R-Y and B-Y variable gain controlling circuits 37 and 38 respectively, and the luminance signal sent from the image signal processing circuit 36. Numeral 42 indicates a diaphragm blade for controlling the amount of the incident light on the master lens group 22, Numeral 43 indicates a diaphragm driving circuit for driving the diaphragm blade 42 and Numeral 44 indicates a diaphragm controlling circuit for controlling the drive of the diaphragm driving circuit 43 in a manner that the relation between the image signal sent from the CCD 35 and a reference voltage $V_{SYC}$ is kept constant.

Figure 4:
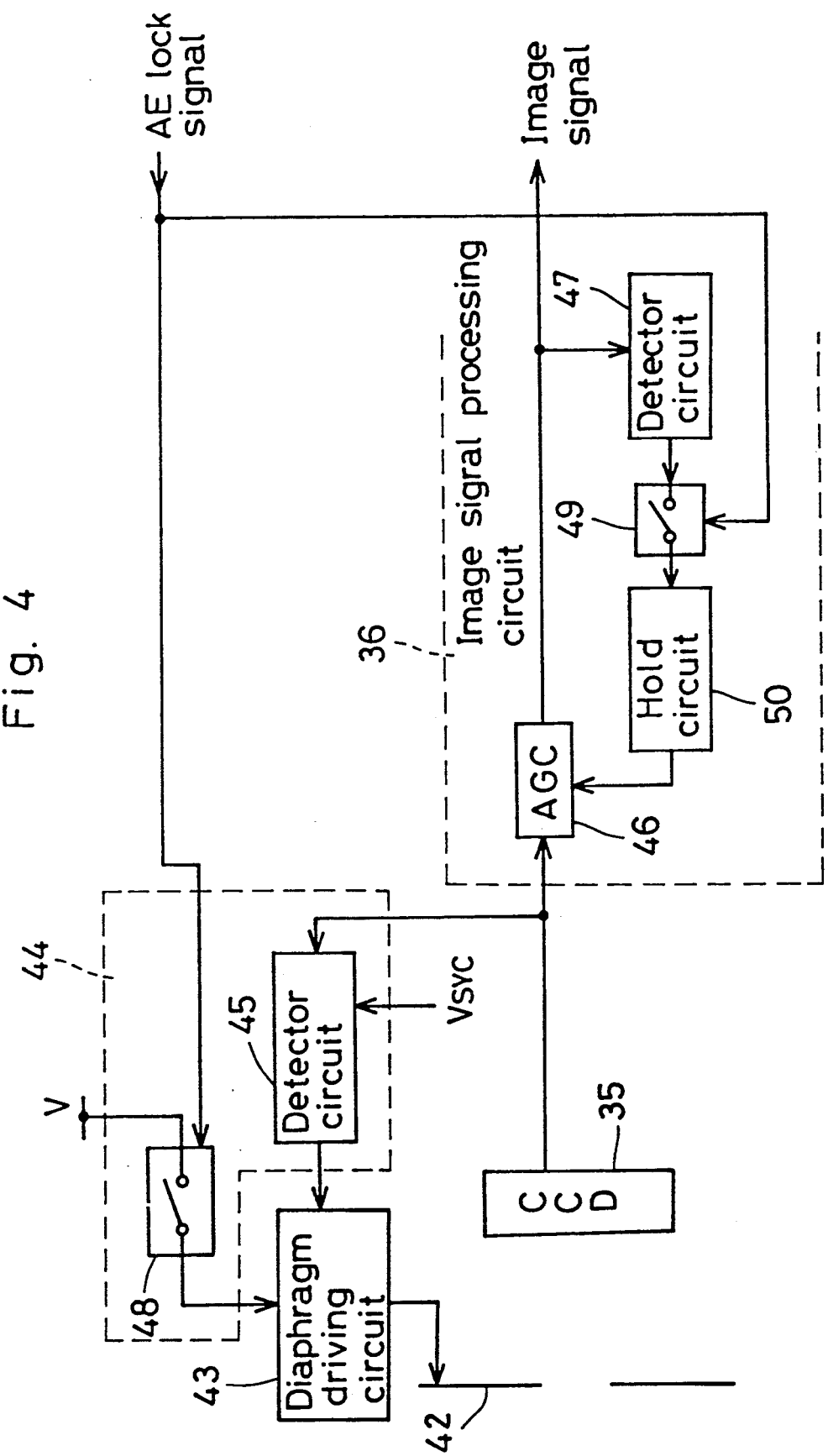
FIG. 4 is a view showing an example of a diaphragm controlling circuit.

FIG. 4 partially and more concretely shows the constitution of the diaphragm controlling circuit 44 and the image signal processing circuit 36. In the normal automatic exposure (hereinafter, referred to as "AE") mode, a detector circuit 45 of the diaphragm controlling circuit 44 detects the image signal sent from the CCD 35 and controls the diaphragm driving circuit 43 so that the detected image signal may hold the constant relation with the reference voltage. Thereby, the diaphragm blade 42 is driven by the diaphragm driving circuit 43 to control the amount of light to be introduced into the CCD 35 through the master lens group 22. Meanwhile, the image signal from the CCD 35 is sent out also to an AGC circuit 46 of the image signal processing circuit 36, the amplifying ratio of which is automatically varied by a feed back loop of a detector circuit 47 which compares the reference voltage with the detected output of the amplified image signal in order to keep the amplified image signal at a constant level. In the case of an AE lock mode, a diaphragm driving voltage input switching circuit 48 and an AGC input switching circuit 49 of the image signal processing circuit 36 are simultaneously turned off by input of an AE lock signal, therefore stopping-down action of the diaphragm blade 42 is fixed irrespective of the control signal from the diaphragm controlling circuit 44 due to the stopping of the supply of an actuating voltage V to the diaphragm driving circuit 43, while the feed back loop of the AGC circuit 46 is cut to thereby cause a hold circuit 50 to hold the state before input of AE lock signal, thereby the amplifying ratio is fixed.

Figure 5:
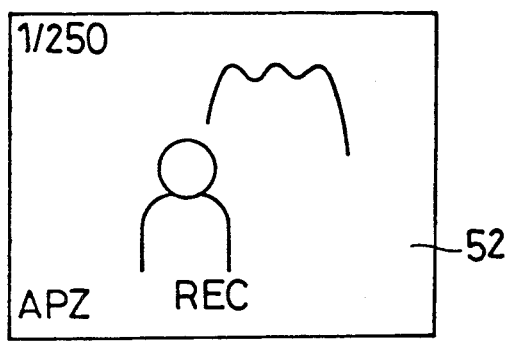
FIG. 5 is a view showing an example of display on a display part.

Next, Numeral 51 indicates a shutter speed controlling circuit which, in the AE mode, varies the time for accumulating the signal charges of the CCD 35 (i.e. varies a shutter speed) in response to a shutter speed command signal from the micro-computer 10. For setting of the shutter speed command signal, the micro-computer 10 judges the brightness of the background and the size of the subject to be photographed from indoor/outdoor information and the information on subject luminance obtained by the white balance sensor 40 and the focus condition detecting module 23 respectively. For example, the shutter speed command signal is set so as to prevent flicker phenomenon at photographing under a fluorescent lamp, and blurring of the image remarkably easy to be caused at low-luminance photographing from occurring. Numeral 52 indicates a display apparatus in an electronic viewfinder of the video camera body, and as shown in FIG. 5, performs shutter speed display in the AE mode, automatic program zooming (hereinafter, referred to as "APZ") mode display, REC (recording) mode display and so on. Numeral 53 indicates an automatic/power zooming changing-over switch for changing-over between the APZ mode and the power zooming mode, Numeral 54 indicates an automatic/power focusing changing-over switch for changing-over between the automatic focusing (hereinafter, referred to as "AF") mode and the power focusing mode and Numeral 55 indicates a REC/standby changing-over switch for performing change-over between an REC mode and a standby mode. Numeral 56 indicates a main power switch, Numeral 57 indicates an AE locking switch, and Numerals 58a and 58b indicate a WIDE/TELE zooming driving button to be depressed at the power zooming mode by a photographer's manual operation. Numeral 59 indicates a zooming velocity varying volume for varying the zooming velocity in the power zooming operation. However at the time of the power zooming operation in the REC mode, the zooming lens components 2a and 2b are prohibited to be driven at high speed on the micro-computer 10 side irrespective of the setting position of the zooming velocity varying volume 59. Numerals 60a and 60b indicate a near/far focusing driving button for focusing by the photographer's manual operation in power focusing mode, Numeral 61 indicates an encoder for detecting whether the zooming lens components 2a and 2b are in the macro range or in the normal zooming range, and Numeral 62 indicates a shortest focal length condition detecting switch for detecting whether or not the zooming lens components 2a and 2b have reached the shortest focal length condition.

According to the present embodiment, the video camera is so constituted as described above. Subsequently, description is made for the control operation in each mode by the micro-computer 10 with reference to flowcharts.

DESCRIPTION FOR THE OPERATION

Figure 6:
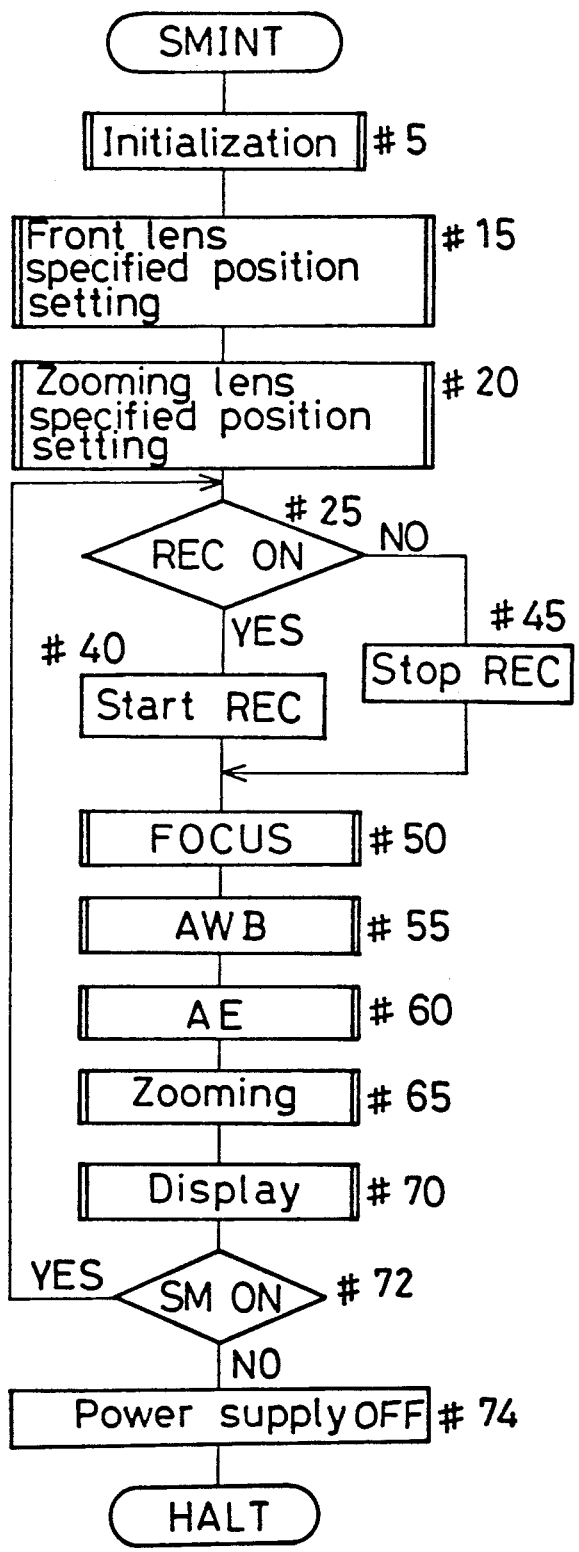
FIG. 6 is a flowchart showing a power interrupt routine in a micro-computer.

First, when the main power switch 57 is turned on, the power voltage is supplied to the whole video camera, the micro-computer is reset once, and thereafter, as shown in FIG. 6, executes a routine of a power interrupt. This means that processing proceeds to step #5 and a subroutine of initialization is executed by turn-on of the power switch 57.

Figure 7:
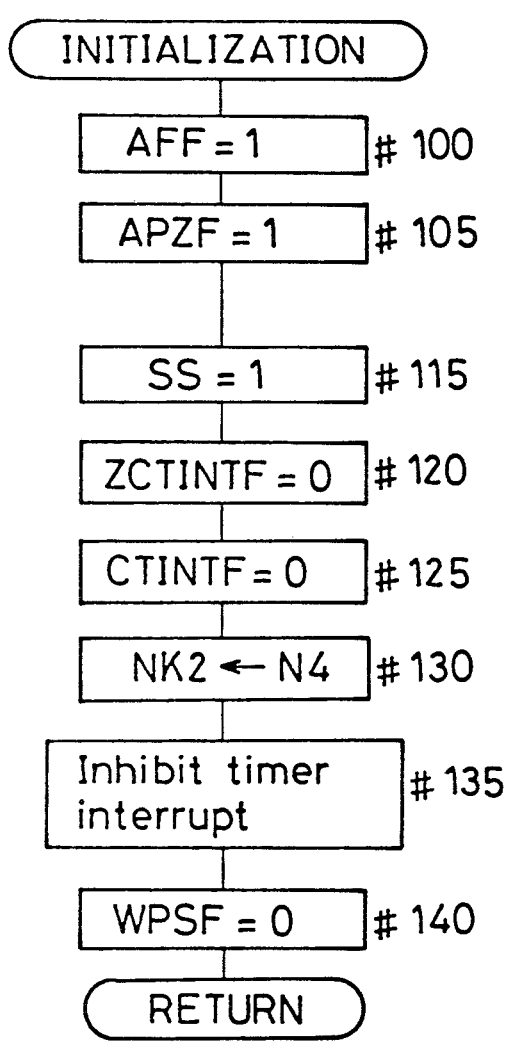
FIG. 7 is a flowchart showing an initialization subroutine.

In the subroutine of initialization as shown in FIG. 7, first, a flag AFF showing the AF mode is set (AFF=1) in step #100 to control the focusing operation in the AF mode, and in the next step #105, a flag APZF showing the APZ mode is set (APZF=1) to control the zooming operation in the APZ mode. Thereafter, processing proceeds to step #115, where the shutter speed of the CCD 35 is set to 1/60 second (SS=1, hereinafter, based on the correspondence of the shutter speed with a variable SS shown in Table 1).

TABLE 1

| SS | Shutter Speed |
|---|---|
| 1 | 1/60 |
| 2 | 1/75 |
| 3 | 1/90 |
| 4 | 1/100 |
| 5 | 1/125 |
| 6 | 1/150 |
| 7 | 1/180 |
| 8 | 1/210 |
| 9 | 1/250 |

In step #120, a flag ZCTINTF showing that a counter interrupt or a timer interrupt (described later) for the zooming lens components 2a and 2b has been executed is reset (ZCTINTF=0) and in step #125, a flag CTINTF showing that the counter interrupt or the timer interrupt for the front lens group 1 has been executed is reset (CTINTF=0). Subsequently, processing proceeds to step #130, where a variable NK$_2$, by which it is judged whether the zooming operation should be permitted or inhibited in comparison with a moving amount $\Delta N_{AF}$ of the front lens group 1 in the AF mode, is set to a value N$_4$ for inhibiting the zooming control, thereafter in step #135, the timer interrupt is inhibited to be executed. In step #140, a flag WPSF showing that an interrupt to be executed when the zooming lens components 2a and 2b have reached the shortest focal length condition has been executed is reset (WPSF=0), and processing returns to a flow of the power interrupt as shown in FIG. 6.

As described above, the subroutine of initialization is executed in step #5, and then processing proceeds to step #15 and a subroutine for setting the front lens group 1 at the specified position is executed.

Figure 8:
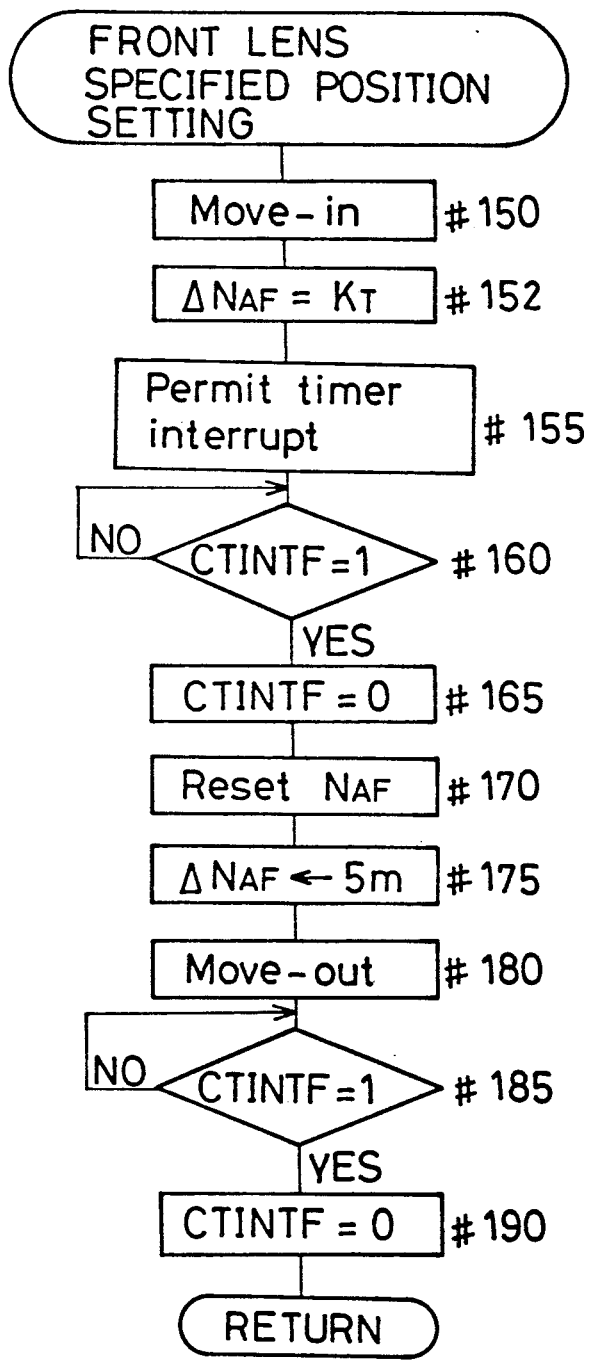
FIG. 8 is a flowchart showing a specified position setting subroutine of a front lens group.

In the subroutine of the specified position setting for the front lens group 1 as shown in FIG. 8, first, in step #150, the motor drive command signal is sent to the motor controlling circuit 9 for the purpose of move-in drive of the front lens group 1 (i.e., the front lens group 1 is driven in the far side direction designated by the arrow A' shown in FIG. 2), and in the next step #152, a predetermined value K$_T$ is set as the moving amount $\Delta N_{AF}$ of the front lens group 1 at a drive counter for the front lens group 1 in order to move the front lens group 1 to the endmost position of move-in. Here, the predetermined value K$_T$ is set as a larger value than the moving amount of the front lens group from the endmost of move-in to the endmost of move-out (in the move-out drive of the front lens group 1 described later, the front lens group 1 is driven in the near direction designated by the arrow A shown in FIG. 2). Subsequently, in step #155, the timer interrupt as described later is permitted to be executed, and judgment is made in step #160 on whether the flag CTINTF showing that the counter interrupt or the timer interrupt for the front lens group 1 has been executed is set.

Till the flag CTINTF is set, the motor controlling circuit 9 controls the drive of the front lens driving motor 3 in response to the motor drive command signal from the micro-computer 10 to start the move-in drive of the front lens group 1. Thereby, the drive pulses are sent from the drive detection device 11 to the micro-computer 10, which executes the counter interrupt for the front lens group 1 in accordance with the flowchart of FIG. 9. On receiving the drive pulses, processing proceeds to step #200, starting the timer for the timer interrupt (the timer for starting the execution of the timer interrupt when a certain time elapses after the stop of input of the drive pulses) after resetting it once, thereafter, proceeding to step #205. In the drive counter for the front lens group 1, the above-mentioned set amount K$_T$ is preset as an initial count value $\Delta N_{AF}$, and it is subtracted every time of the input of the driving pulse. Next, it is judged in step #210 whether or not the count value $\Delta N_{AF}$ of the drive counter for the front lens group 1 has fallen to 0 ($\Delta N_{AF}=0$). In this case, since the set value K$_T$ is a larger value than the moving amount from the endmost position of move-in to the endmost position of move-out, $\Delta N_{AF}=0$ is impossible to be reached even if the front lens group 1 reaches the endmost position of move-in. Therefore, processing immediately returns to the flow of the specified position setting for the front lens group 1.

Figure 10:
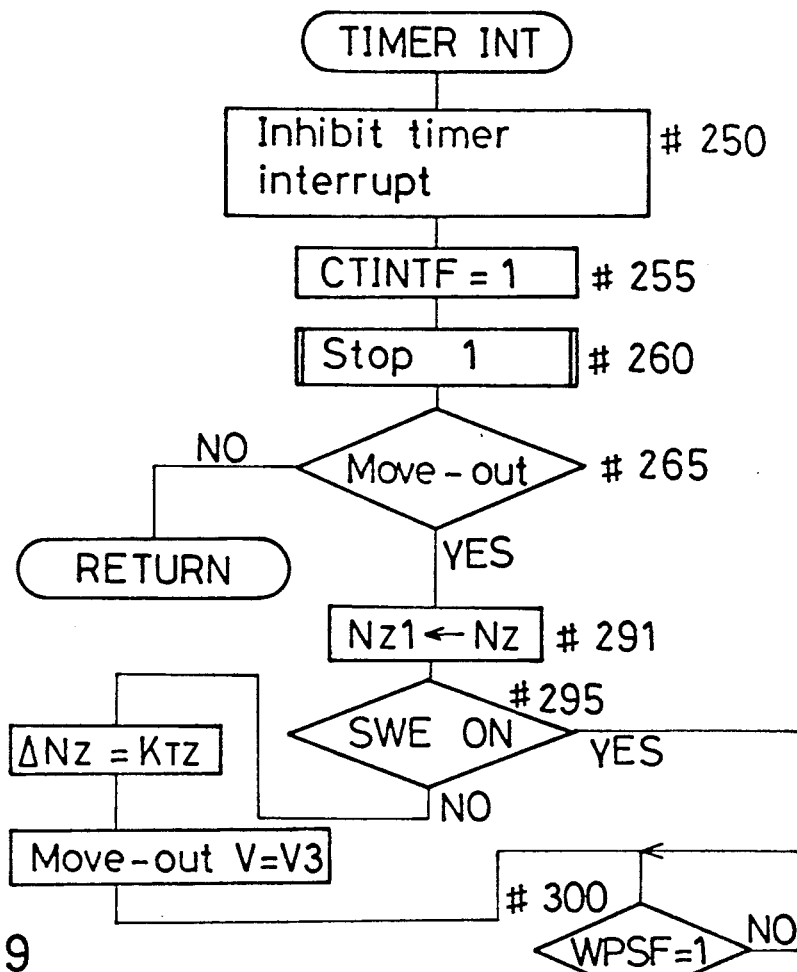
FIG. 10 is a flowchart showing a timer interrupt subroutine.

When the drive of the front lens group 1 is stopped at the endmost position of move-in, and thereby the drive detection device 11 stops sending out the drive pulses, the micro-computer 10 executes the routine of the timer interrupt as shown in FIG. 10 after elapse of the predetermined time by the timer for the timer interrupt. First, in step #250, the timer interrupt is inhibited, and in the following step #255, the flag CTINTF showing that the timer interrupt has been executed is set, and a subroutine of front lens stop is executed in step #260.

Figure 11:
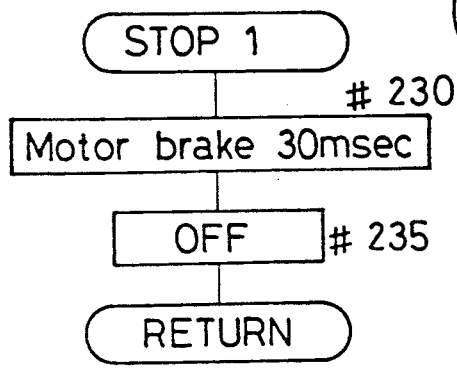
FIG. 11 is a flowchart showing a lens drive stopping subroutine of the front lens group.

In the subroutine of front lens stop as shown in FIG. 11, in order to stop the front lens group 1, the motor drive command signal is sent to the motor controlling circuit 9 to apply brake to the front lens driving motor 3 in step #230, the brake is turned off after an elapse of 30 msec in step #235, and processing returns to the flow of the timer interrupt shown in FIG. 10.

Subsequently, in step #265, judgment is made on whether the front lens group 1 has been moved-out before stopped, however, this case is the move-in drive of the front lens group 1, so processing immediately returns to the flow of the specified position setting for the front lens group 1.

Accordingly, the flag CTINTF showing that the timer interrupt for the front lens group 1 has been executed is judged to be set in step #160, and reset in the next step #165. Then, a position counter for counting a move-out amount $N_{AF}$ from the endmost state of move-in is reset in step #170. This position counter is a hardware counter (not illustrated) which counts-up in the case of move-out of the lens and counts-down in the case of move-in in order to specify the position of the front lens group 1 (i.e., the subject distance). After resetting of the position counter, in step #175, the moving amount $\Delta N_{AF}$ of the front lens group 1 is so set at the drive counter for the front lens group 1 that the front lens group 1 is set at the position corresponding to subject distance=5 m, and in step #180, the motor drive command signal is sent to the motor controlling circuit 9 to move-out the front lens group 1.

Figure 9:
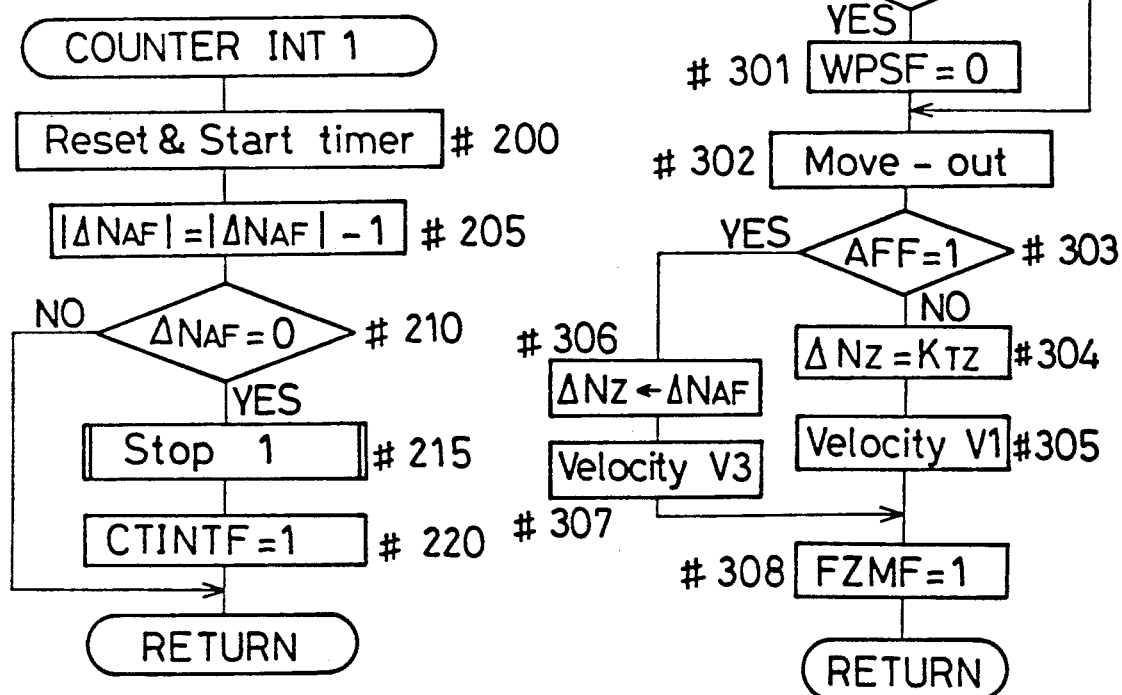
FIG. 9 is a flowchart showing a counter interrupt subroutine for the front lens group.

Accordingly, the motor controlling circuit controls the drive of the front lens driving motor 3 in response to the motor drive command signal from the micro-computer 10 to start the move-out drive of the front lens group 1, thereby the drive pulses are sent from the drive detection device 11. On receiving the drive pulses, the micro-computer 10 executes the counter interrupt for the front lens group 1 as shown in FIG. 9. First, in step #200, the timer for the timer interrupt is started after it is reset once (In this case, the timer interrupt is inhibited), and processing proceeds to step #205, where the count value $\Delta N_{AF}$ of the drive counter for the front lens group 1 is subtracted every time of the input of the driving pulse, and thereafter in step #210, judgment is made on whether or not the value $\Delta N_{AF}$ after the subtraction has fallen to 0 ($\Delta N_{AF}=0$). If judgment results in $\Delta N_{AF}=0$ in step #210, the subroutine for stopping the front lens group 1 as described above referring to FIG. 11 is executed in step #215, thereafter processing proceeds to step #220, setting the flag CTINTF showing that the counter interrupt for the front lens group 1 has been executed, and returns to the flow for setting the specified position of the front lens group 1.

Accordingly, in step #185, the flag CTINTF showing that the timer interrupt for the front lens group 1 has been executed is judged to be set, and reset in the next step #190, thereafter processing returns to the flow of the power interrupt as shown in FIG. 6.

Thus, the subroutine of the front lens specified position setting has been executed in step #15, and then processing proceeds to step #20, executing a subroutine for setting the zooming lens components 2a and 2b at the specified position.

Figure 12:
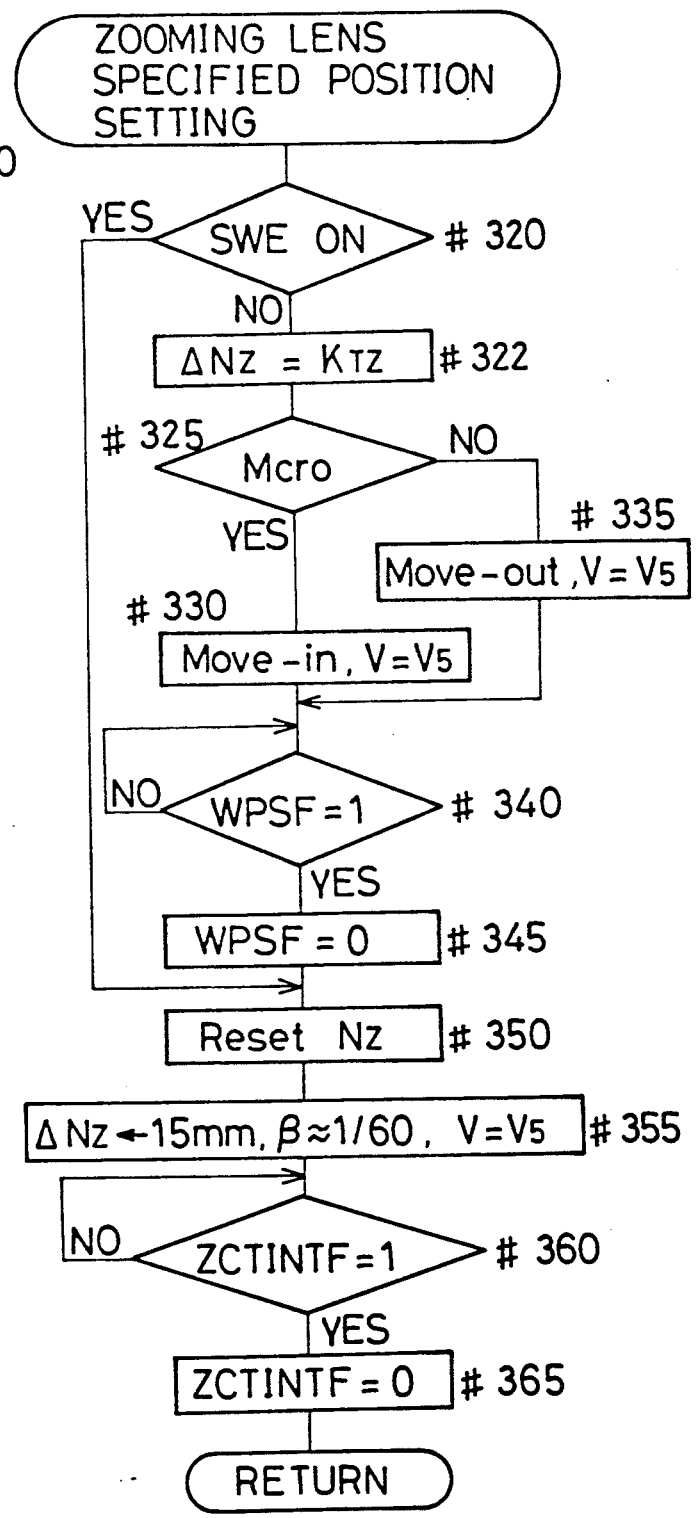
FIG. 12 is a flowchart showing a specified position setting subroutine of a zooming lens group.

As shown in FIG. 12, in the subroutine for setting the specified position of the zooming lens components 2a and 2b, first, in step #320, judgment is made on whether the zooming lens components 2a and 2b are at present in the shortest focal length condition by whether the shortest focal length condition detecting switch 62 is turned on or off. If they are in the shortest focal length condition (i.e., the shortest focal length condition detecting switch 62 is turned on), processing proceeds to step #350. On the contrary, if they are not in the shortest focal length condition, processing proceeds to step #322, setting a moving amount $\Delta N_Z$ of the zooming lens components 2a and 2b to $K_{TZ}$. Here, the value $K_{TZ}$ is a value never taken as the moving amount of the zooming lens components 2a and 2b. In the following step #325, it is judged whether or not the zooming lens components 2a and 2b are in the macro range. If they are in the macro range, processing proceeds to step #330, sending the motor drive command signal to the motor controlling circuit 18 to move-in the zooming lens components 2a and 2b (therefore, the zooming lens components 2a and 2b are driven in the wide direction designated by the arrow B' shown in FIG. 2), and also sending the velocity command signal to the velocity controlling circuit 19 to set the drive velocity of the zooming lens components 2a and 2b to a highest velocity $V_5$ shown on Table 2. On the other hand, in the case where they are not in the macro range, processing proceeds to step #335, sending the motor drive command signal to the motor controlling circuit 18 to move-out the zooming lens components 2a and 2b (therefore, the zooming lens components 2a and 2b are driven in the tele direction designated by the arrow B shown in FIG. 2), and also sending the velocity command signal to the velocity controlling circuit 19 to set the drive velocity of the zooming lens components 2a and 2b to the highest velocity $V_5$.

TABLE 2

| Drive Velocity of the zooming lens components | Time required for moving from the shortest to the longest focal length condition (second) |
|---|---|
| $V_1$ | 6 |
| $V_2$ | 5 |
| $V_3$ | 4 |
| $V_4$ | 2 |
| $V_5$ | 1 |

The reason that the drive velocity of the zooming lens components 2a and 2b is set to the highest velocity $V_5$ is that the zooming lens components 2a and 2b are at present desired to be put into the standby state as soon as possible without taking account of adjustment concerning recording or an angle of view. For example, at the power zooming operation in the REC mode, the drive velocity is set to a velocity within $V_1$ through $V_3$ to prevent rapid change in the angle of view from occurring, and at the power zooming operation in the standby mode of recording, the velocity command signal for setting the velocity to $V_1$ through $V_4$ is sent so as not to give such a disadvantage that too high velocity makes it impossible to adjust the angle of view to a desired one, though the adjustment of the angle of view is wanted to be performed as soon as possible before the photographing operation is started.

Figure 13:
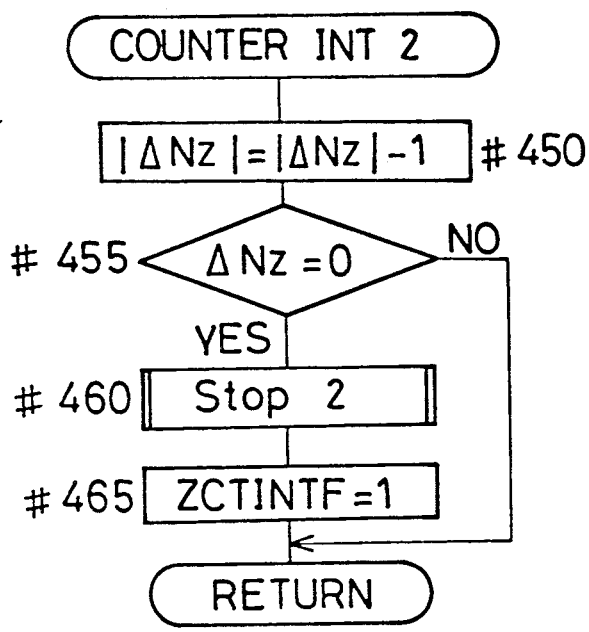
FIG. 13 is a flowchart showing a counter interrupt subroutine for the zooming lens group.

Accordingly, the motor controlling circuit 18 controls the zooming lens driving motor 12 in response to the motor drive command signal from the micro-computer 10 and the velocity controlling voltage from the velocity controlling circuit 19, thereby the move-out or move-in drive of the zooming lens components 2a and 2b is started. The start of lens drive of the zooming lens components 2a and 2b makes the drive detection device 20 send the drive pulses to the micro-computer 10, which executes a subroutine of the counter interrupt for the zooming lens components 2a and 2b in accordance with the flowchart as shown in FIG. 13. First, when the drive pulses are received, processing proceeds to step #450, where the value of the moving amount $\Delta N_z$ of a drive counter for the zooming lens components 2a and 2b is counted-down, and in the following step #455, judgement is made on whether or not the count value $\Delta N_z$ has fallen to 0 ($\Delta N_z=0$). In this case, since the value $K_{TZ}$ is set as a value never taken by the moving amount $\Delta N_Z$ of the zooming lens components 2a and 2b, $\Delta N_Z=0$ is not attained even if the zooming lens components 2a and 2b have reached the shortest focal length condition, therefore processing immediately returns to the flow for setting the specified position of the zooming lens components 2a and 2b as shown in FIG. 12.

Figure 14:
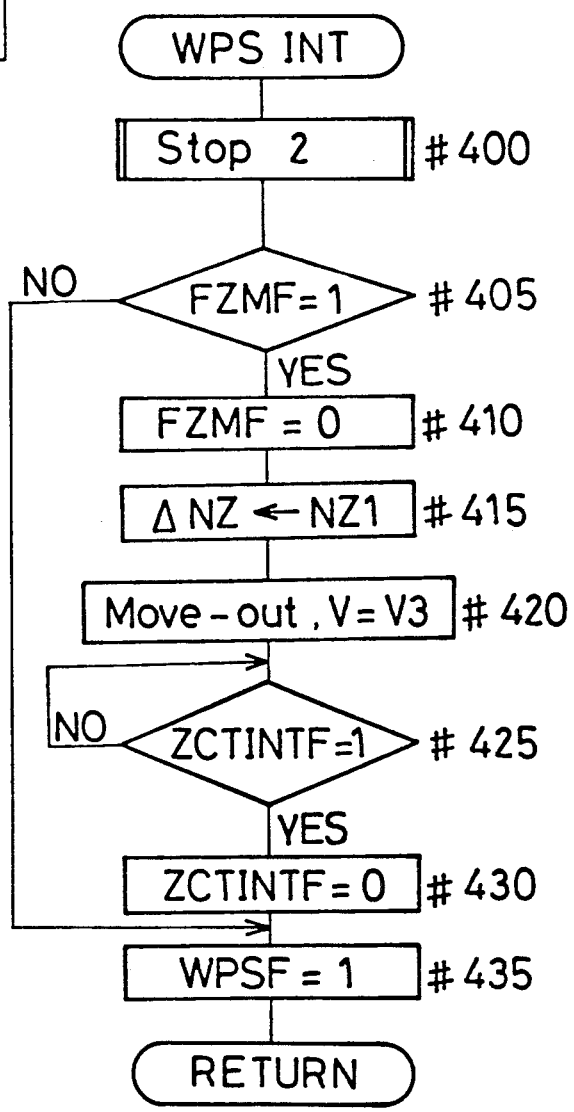
FIG. 14 is a flowchart showing an interrupt subroutine at the shortest focal length.

When the zooming lens components 2a and 2b have reached the shortest focal length condition and the shortest focal length condition detecting switch 62 is turned on, a subroutine of the interrupt at the shortest focal length condition is executed according to the flowchart as shown in FIG. 14. First, processing proceeds to step #400, executing a subroutine of stopping the zooming lens components 2a and 2b.

Figure 15:
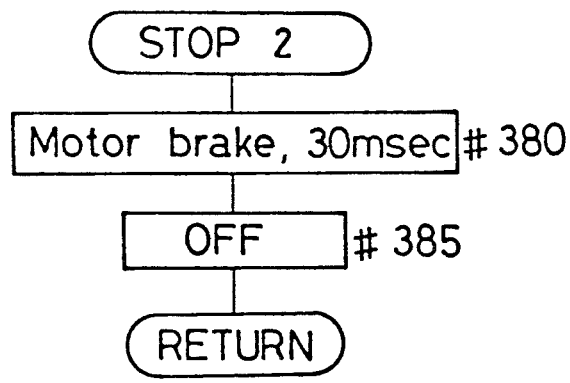
FIG. 15 is a flowchart showing a lens stopping subroutine of the zooming lens group.

In the subroutine of stopping the zooming lens components 2a and 2b as shown in FIG. 15, first, in order to stop the drive of the zooming lens components 2a and 2b, a brake is applied to the zooming lens driving motor 12 by sending the motor drive command signal to the motor controlling circuit 18 in step #380. In the following step #385, the brake is turned off after an elapse of 30 msec, and then processing returns to the flow of the interrupt at the shortest focal length condition as shown in FIG. 14.

Next, judgement is made on whether or not a flag FZMF showing the focusing mode by the zooming lens components 2a and 2b (i.e., the macro focusing) has been set. In this case, since the flag FZMF has not been set, processing proceeds to step #435, setting the flag WPSF showing that the interrupt at the shortest focal length condition has been executed, and returns to the flow of the specified position setting for the zooming lens components 2a and 2b as shown in FIG. 12.

Accordingly, in step #340, the flag WPSF showing that the interrupt at the shortest focal length condition has been executed is judged to be set, and then reset in the next step #345. Subsequently, in step #350, a position counter which counts a move-in amount (in the normal zooming range) or a move-out amount (in the macro range) $N_Z$ from the shortest focal length condition in order to specify the position of the zooming lens components 2a and 2b is reset. This position counter is a hardware counter (not illustrated) which counts-up during move-out of the lens and counts-down during move-in drive. After resetting the position counter, in step #355, the moving amount $\Delta N_Z$ of the zooming lens components 2a and 2b is so set at the drive counter for the zooming lens components 2a and 2b that the lens components 2a and 2b are set at the position of the focal length of 15 mm (magnification $\beta \approx 1/60$). Further, in the same step #355, the motor drive command signal is sent to the motor controlling circuit 18 to move-in the zooming lens components 2a and 2b, and also the velocity command signal is sent to the velocity controlling circuit 19 to set the drive velocity of the zooming lens components 2a and 2b to $V_5$ shown on Table 2.

And, the motor controlling circuit 18 controls the drive of the zooming lens driving motor 12 in response to the motor drive command signal from the micro-computer 10 and the velocity controlling voltage from the velocity controlling circuit 19, and thereby the zooming lens components 2a and 2b start the drive of move-out, which make the drive detection device 20 send the drive pulses to the micro-computer 10. Inputting the drive pulses, the micro-computer 10 executes the counter interrupt for the zooming lens components 2a and 2b according to the flowchart as shown in FIG. 13. First, the input of the drive pulses advances processing to step #450, where the value of the moving amount $\Delta N_Z$ of the zooming lens components 2a and 2b is counted-down in the drive counter for the zooming lens components 2a and 2b, and it is judged in step #455 whether or not the count value $\Delta N_Z$ has fallen to 0 ($\Delta N_Z=0$). If the judgment results in $\Delta N_Z=0$, processing proceeds to step #460, executing the subroutine for stopping the lens drive of the zooming lens components 2a and 2b as described above with reference to FIG. 15, and thereafter proceeds to step #465, setting the flag ZCTINTF showing that the counter interrupt for the zooming lens components 2a and 2b has been executed, and returns to the flow of the specified position setting for the zooming lens components 2a and 2b as shown in FIG. 12.

And, the flag ZCTINTF showing that the counter interrupt for the zooming lens components 2a and 2b has been executed is judged to be set in step #360, and reset in the next step #365, and thereafter processing returns again to the flow of the power interrupt as shown in FIG. 6.

As described above, the subroutine of the specified position setting of the zooming lens components 2a and 2b is executed, and then processing proceeds to step #25, where it is judged whether or not a recording switch (not illustrated) has been turned on. If the switch is in the ON state, processing proceeds to step #40, where a recording start signal is coupled to a recording circuit (not illustrated), and if in the OFF state, processing proceeds to step #45, where a recording end signal is outputted, and then, executes the focusing subroutine in the following step #50.

Figure 16:
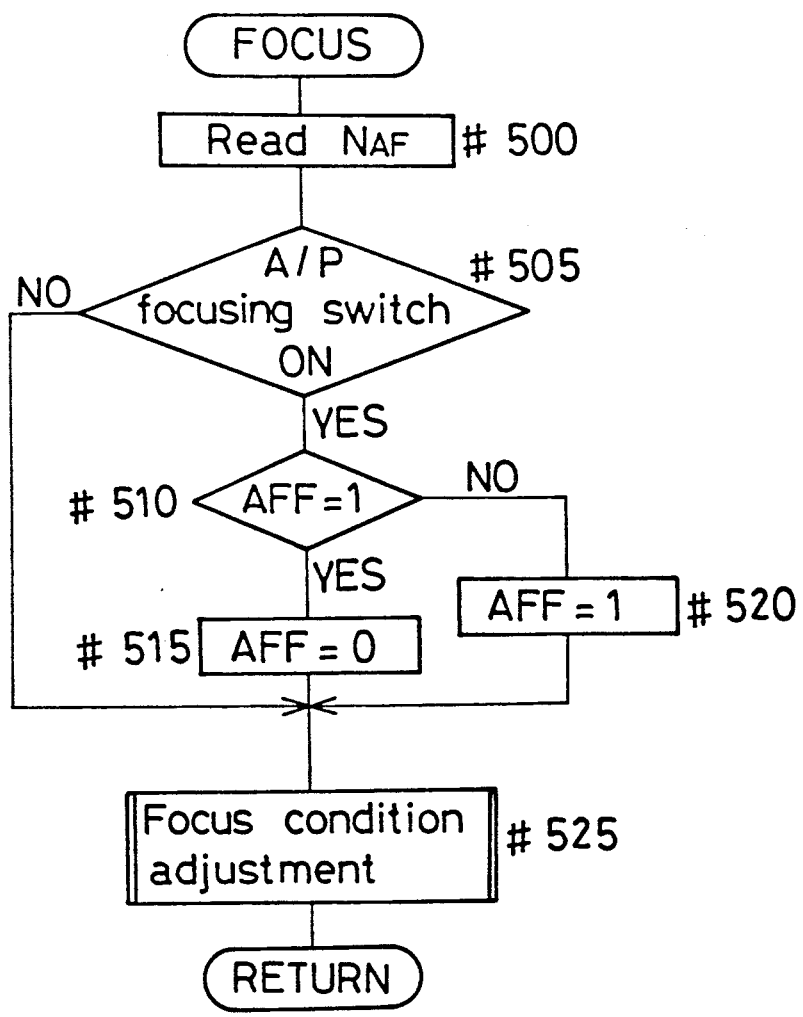
FIG. 16 is a flowchart showing a focusing subroutine.

In the focusing subroutine as shown in FIG. 16, first, the present move-out value $N_{AF}$ is read from the position counter for the front lens group 1 in step #500, and judgment is made on whether or not the automatic/-power focusing changing-over switch 54 has turned on in the next step #505. In the case of the OFF state, processing immediately proceeds to step #525, while in the case of the ON state, processing proceeds to step #510, where judgment is made on whether or not the set mode was the AF mode prior to turning on the switch 54, in other words, whether or not the flag AFF showing the AF mode was set. When the flag AFF was set, it is reset for setting the power focusing mode in step #515. When it was not set, setting this flag AFF in step #520, processing proceeds to step #525, where the subroutine of the focus condition adjustment is executed.

Figure 17:
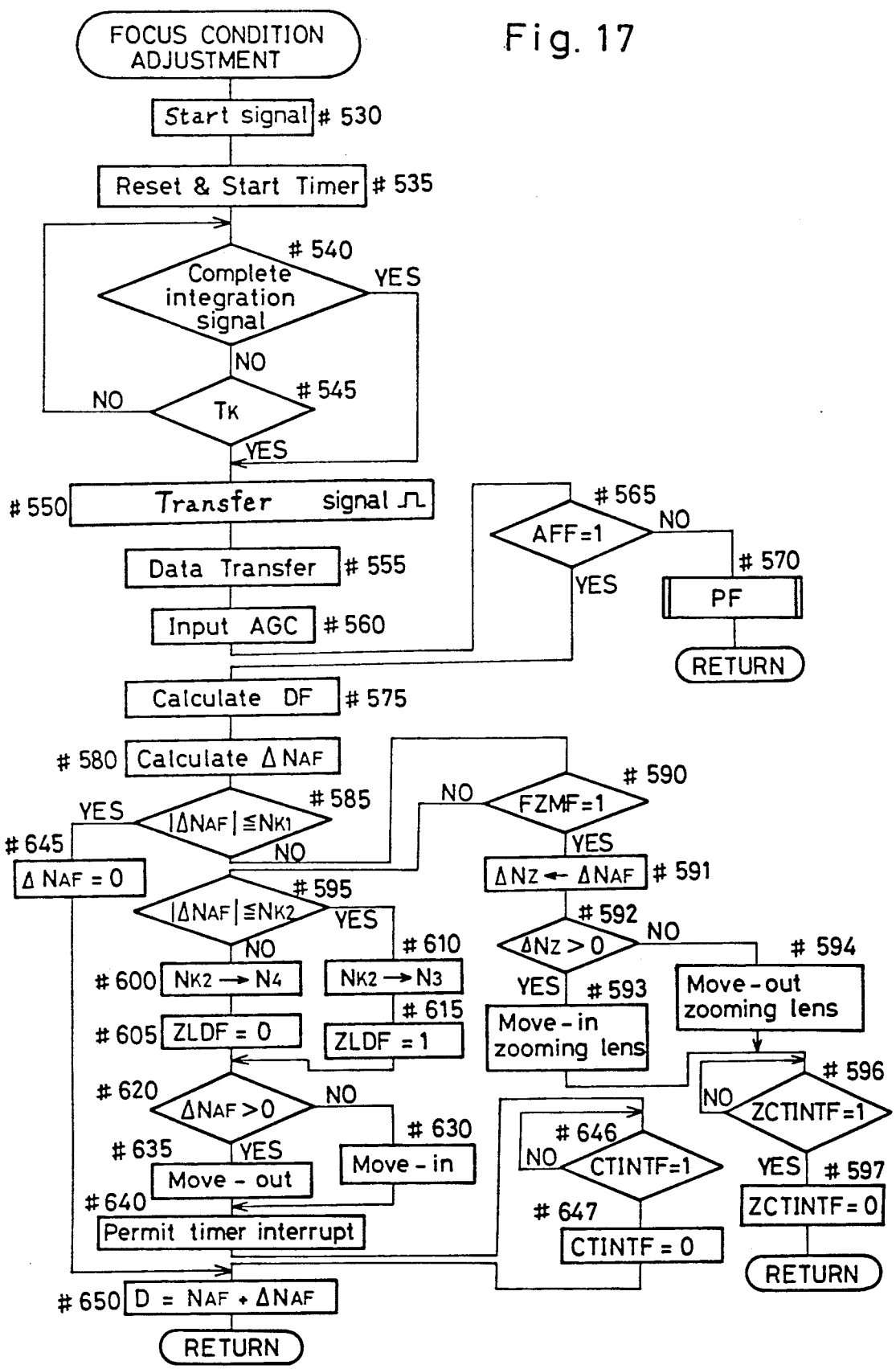
FIG. 17 is a flowchart showing a focus condition adjustment subroutine.

In the subroutine of the focus condition adjustment as shown in FIG. 17, first, in step #530, the focus condition detection start signal is sent to the focus condition detecting module 23, and thereafter a timer for restricting integration time on the CCD 24 is actuated (working time = $T_K$) in step #535. And then, judging that the integration end signal is outputted from the module controlling circuit 23 in step #540, or that the working time $T_K$ has elapsed from the start of the timer in step #545, the micro-computer outputs the transfer command signal in step #550. In the next step #555, the focus condition detection signal is received after A/D conversion, and further in step #560, the AGC signal is received from the AGC circuit 33. Subsequently, it is judged in step #565 whether or not the flag AFF showing the AF mode has been set. When the flag AFF has not been set, assuming the set mode to be the power focusing mode, processing proceeds to step #570, where the subroutine of the power focusing mode as described below is executed, and thereafter returns to the flow of the power interrupt as shown in FIG. 6. When the flag AFF has been set, processing proceeds to step #575, where a defocus amount DF is calculated based on the focus condition detection signal, further in step #580, the moving amount $\Delta N_{AF}$ of the front lens group 1 is calculated corresponding to the defocus amount DF, and thereafter it is judged in step #585 whether or not an absolute value $|\Delta N_{AF}|$ of the amount $\Delta N_{AF}$ is not more than a predetermined value $NK_1$. In the case of $|\Delta N_{AF}| \leq NK_1$, judging the focus condition as infocus, $\Delta N_{AF} = 0$ is set in step #645. Subsequently, processing proceeds to step #650, where a subject distance D is calculated by adding the drive amount $\Delta N_{AF}$, by which the front lens group 1 should be driven, to the move-out amount $N_{AF}$ of the front lens group 1 ($D = N_{AF} + \Delta N_{AF}$), and thereafter, returns to the flow of the power interrupt as shown in FIG. 6. In reverse, in the case of $|\Delta N_{AF}| > NK_1$, judging the focus condition as out-of-focus, first, it is judged in step #590 whether or not the flag FZMF showing the focusing mode by the zooming lens components 2a and 2b (i.e., the macro focusing) has been set. When the flag FZMF has been set, assuming that the set mode is the focusing mode by the zooming lens components 2a and 2b (i.e., the macro focusing), the moving amount $\Delta N_{AF}$ of the front lens group 1 is converted to the moving amount $\Delta N_Z$ of the zooming lens components 2a and 2b in step #591. In the next step #592, it is judged whether the moving amount $\Delta N_Z$ is a positive value or a negative one (that is, the focusing direction is judged). If positive, judging the focus condition as front-focus, processing proceeds to step #593, where the motor drive command signal is sent to the motor controlling circuit 18 to move-in the zooming lens components 2a and 2b. In reverse, if negative, judging the focus condition as rear-focus, processing proceeds to step #594, where the motor drive command signal for moving-out the zooming lens components 2a and 2b is sent to the motor controlling circuit 18. When the move-out or move-in drive of the zooming lens components 2a and 2b is thus started, it is judged in step #596 that the above-described counter interrupt for the zooming lens components 2a and 2b has been executed as shown in FIG. 13 (i.e., it is judged that infocus condition has been attained by driving the zooming lens components 2a and 2b by the amount $\Delta N_Z$), and then processing returns to the flow of the power interrupt as shown in FIG. 6 after resetting the flag ZCTINTF in step #597.

On the other hand, in the case where the flag FZMF has not been set in step #590, assuming the set mode as the focusing mode by the front lens group 1, judgment is made in step #595 again whether or not the absolute value $|\Delta N_{AF}|$ of the moving amount of the front lens group 1 is not more than the predetermined value $NK_2$ ($> NK_1$). If $|\Delta N_{AF}| \leq NK_2$, the value $NK_2$ is set to $N_3$ ($> NK_2$) in step #610, and thereafter in step #615, a flag ZLDF showing permission of the zoom control is set. Here, it is the reason why the predetermined value $NK_2$ is set again to the larger value $N_3$ that the zoom control is desired not to be put into the inhibited state from the permitted state. On the other hand, if $|\Delta N_{AF}| > NK_2$, the value $NK_2$ is set to $N_4$ ($< NK_2$) in step #600, and thereafter the flag ZLDF showing the permission of the zoom control is reset (the zoom control is inhibited) in step #605. Here, the reason that the predetermined value $NK_2$ is set again to the smaller value $N_4$ is that the zoom control is desired not to be put into the permitted state from the inhibited state. In addition, if the zooming operation is performed to alter the magnification in such relatively intense out-of-focus condition, the image becomes more blurry, which results in giving an undesirable effect to the video camera continuously performing photographing (recording) operation. Further, even in the APZ mode, the zoom control is inhibited, and permitted when focusing is attained to some extent.

Next, it is judged in step #620 whether the moving amount $\Delta N_{AF}$ is a positive value or a negative one. In the case of positive, judging the focus condition as front-focus, processing proceeds to step #635, where the motor drive command signal is sent to the motor controlling circuit 3 to move-out the front lens group 1. In the case of negative, judging the focus condition as rear-focus, processing proceeds to step #630, where the motor drive command signal for moving-in the front lens group 1 is sent to the motor controlling circuit 3. Thereafter, the timer interrupt is permitted in step #640. The start of move-in or move-out drive of the front lens group 1 makes the micro-computer 10 execute the counter interrupt for the front lens group 1 as described above referring to FIG. 9, and the counter interrupt is judged in step #646 to have been executed (infocus condition has been attained by driving the front lens group 1 by the amount $\Delta N_{AF}$). After resetting the flag CTINTF in step #647, processing passes through step #650 described before, returning to the flow of the power supply as shown in FIG. 6.

In the flow of the counter interrupt for the front lens group 1 as shown in FIG. 9, if the value $\Delta N_{AF}$ after the subtraction in step #210 does not equal 0, that is, if the front lens group 1 has reached the position of the endmost of move-out or move-in before driven by the moving amount $\Delta N_{AF}$, the above-described timer interrupt in FIG. 10 is executed. First, after inhibiting the timer interrupt in step #250, processing proceeds to step #255, where the flag CTINTF showing that the timer interrupt has been executed is set, and in the following step #260, the above-described subroutine for stopping the front lens group 1 is executed. In step #265, it is judged whether or not the front lens group 1 has been moved-out before stopped, and if move-in drive, judging the focus condition as infocus at infinity, processing returns to the flow as shown in FIG. 17, and then returns again to the flow of the power interrupt as shown in FIG. 6 through steps #646, #647 and #650. In reverse, when judgment results in move-out drive in step #265, judging that the front lens group 1 is at the position of the endmost of move-out, a count value $N_Z$, which shows the present driven position of the zooming lens components 2a and 2b, is inputted as $N_Z=N_{Z1}$ in step #291, and in the next step #295, it is judged whether or not the zooming lens components 2a and 2b are positioned at the shortest focal length condition, from judgment of whether or not the shortest focal length condition detecting switch 62 is turned on. When the zooming lens components 2a and 2b are at the shortest focal length condition (i.e., the shortest focal length condition detecting switch 62 is turned on), processing proceeds to step #302, and in reverse, when the zooming lens components 2a and 2b are not positioned at the shortest focal length condition, processing proceeds to step #296, where the moving amount $\Delta N_Z$ of the zooming lens components 2a and 2b is set to $K_{TZ}$. At this time, since the zooming lens components 2a and 2b are not in the macro range, the motor drive command signal for moving-out the zooming lens components 2a and 2b is sent to the motor controlling circuit 12, and the velocity command signal for setting the drive velocity of the zooming lens components 2a and 2b to $V_3$ shown on Table 2 is sent to the velocity controlling circuit 19. Here, the reason that the drive velocity is set to $V_3$ is that focusing is wanted to be completed as soon as possible to such an extent that the reproduced image is easy to be seen, because the rapid variation in the angle of view due to the excessive fast drive velocity makes the reproduced image hard to be seen.

When the drive of move-out of the zooming lens components 2a and 2b is started, the drive pulses are sent from the drive detection device 20 to the microcomputer 10, which executes the flow of the counter interrupt for the zooming lens components 2a and 2b as described above referring to FIG. 13. However, since the set value $K_{TZ}$ is never taken as the moving amount of the zooming lens components 2a and 2b, judgment never results in $\Delta N_Z=0$, even if the zooming lens components 2a and 2b have reached the shortest focal length condition, therefore processing returns to the flow as shown in FIG. 10.

When the zooming lens components 2a and 2b have reached the shortest focal length condition and the shortest focal length condition detecting switch 62 is in the ON state, the interrupt at the shortest focal length condition is executed according to the flowchart as shown in FIG. 14. First, the subroutine of the zooming lens stopping is executed in step #400 as described above referring to FIG. 15, and thereafter in the next step #405, it is judged whether or not the flag FZMF showing the focusing mode by the zooming lens components 2a and 2b has been set. Since the flag FZMF has not been set at the time when focus condition adjustment by the front lens group 1 has just shifted to that by the zooming lens components 2a and 2b, processing proceeds to step #435, where the flag WPSF showing that the interrupt at the shortest focal length condition has been executed is set, and processing returns to the flow in FIG. 10.

In the flow of the interrupt at the shortest focal length condition as shown in FIG. 14, for example, when judgment results in that the flag FZMF showing the focusing mode by the zooming lens components 2a and 2b has been set, processing proceeds to step #410, where, assuming that the zooming lens components 2a and 2b are driven from the macro range to the shortest focal length condition, the flag FZMF is reset, and in the following step #415, the moving amount $\Delta N_Z$ of the zooming lens components 2a and 2b is set so that the lens components 2a and 2b are located at the driven position $N_{Z1}$ previously input. And then, in step #420, the zooming lens components 2a and 2b are commanded to be moved-out at the velocity $V_3$, and thereafter if it is judged that the counter interrupt has been executed in step #425, processing returns through steps #430 and #435.

Accordingly, it is judged in step #300 that the flag WPSF showing the execution of the interrupt at the shortest focal length condition has been set, and reset in the next step #301. Subsequently, after sending the motor drive command signal to the motor controlling circuit 18 in order to move-out the zooming lens components 2a and 2b for the focus condition adjustment in step #302, it is judged in step #303 whether or not the flag AFF showing the AF mode is set. In the case of the AF mode (the flag AFF is set), the moving amount $\Delta N_{AF}$ is converted to the moving amount $\Delta N_Z$ of the zooming lens components 2a and 2b in step #306, and in following step #307, the velocity command signal is sent to the velocity controlling circuit 19 so that the drive velocity may be set to the relatively high velocity $V_3$ shown on Table 2 for AF operation. On the other hand, in the case of the power focusing mode (the flag AFF is not set), after setting the moving amount $\Delta N_Z$ of the zooming lens components 2a and 2b to the predetermined value $K_{TZ}$ in step #304, the velocity command signal is sent to the velocity controlling circuit 19 so that the drive velocity is set to the lowest velocity $V_1$ for manual focusing in step #305.

When the start of the move-out drive of the zooming lens components 2a and 2b makes the drive detection device 20 send out the drive pulses, the above-described counter interrupt for the zooming lens components 2a and 2b is executed to adjust focus condition according to the flowchart as shown in FIG. 13. And in step #308, setting the flag FZMF showing the focusing mode by the zooming lens components 2a and 2b, processing returns to the flow as shown in FIG. 17, and further returns to the power interrupt as shown in FIG. 6 through steps #646, #647 and #650.

Figure 18:
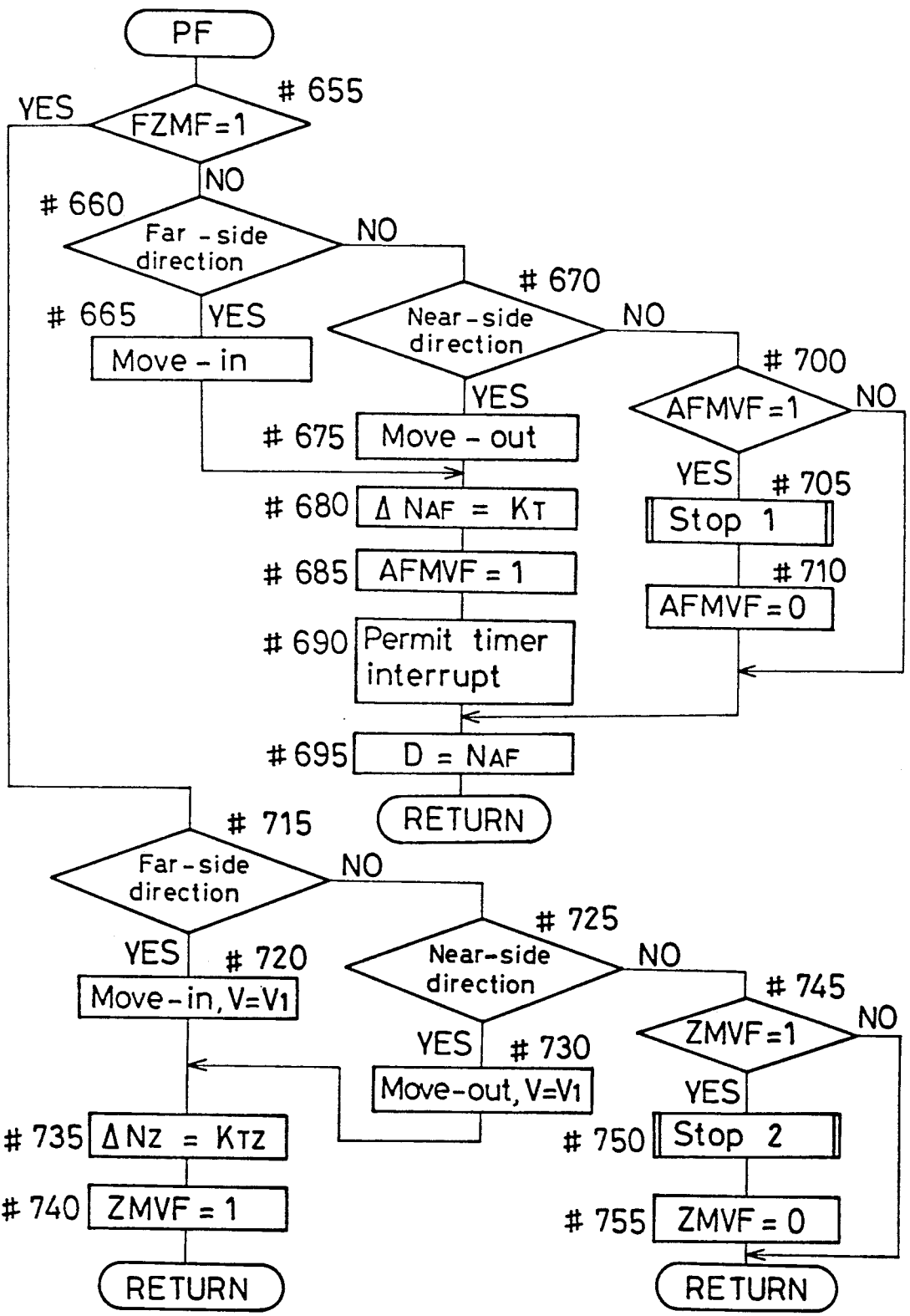
FIG. 18 is a flowchart showing a subroutine of a power focusing mode.

Next, description is made for the subroutine of the power focusing mode as shown in FIG. 18, which is executed in the case where judgment results in the power focusing mode in the subroutine of the focus condition adjustment shown in FIG. 17. First, it is judged in step #655 whether or not the flag FZMF showing the focusing mode by the zooming lens components 2a and 2b has been set. When the flag FZMF has not been set, judging the set mode as the focusing mode by the front lens group 1, it is judged in step #660 whether or not focusing is performed in the direction of infinity. In the case of the direction of infinity as a result that the far focusing driving button 60b is operated, processing proceeds to step #665, where the motor drive command signal for moving-in the front lens group 1 is sent to the motor controlling circuit 9. When the focusing direction is not infinity, it is judged in step #670 whether or not focusing is performed in the near-side direction. In the case of the near-side direction as a result that the near focusing driving button 60a is operated, processing proceeds to step #675, where the motor drive command signal is sent to the motor controlling circuit 9 to move-out the front lens group 1. Subsequently, the moving amount $\Delta N_{AF}$ of the front lens group 1 is set to $K_T$ in step #680, thereby the subroutine of the front lens stopping due to the counter interrupt for the front lens group 1 is prevented from being executed, and thereafter processing proceeds to step #685, where a flag AFMVF showing that the front lens group 1 is under driving is set, and the timer interrupt is permitted in step #690.

When the start of the move-out or move-in drive of the front lens group 1 makes the drive detection device 11 send out the drive pulses, the above-described counter interrupt for the front lens group 1 is executed according to the flowchart as shown in FIG. 9. However, since the set value $K_T$ is a larger value which is never taken as the moving amount of the front lens group 1, this is unnecessary to be taken into consideration. Accordingly, after executing the above-described timer interrupt according to the flowchart as shown in FIG. 10, processing proceeds to step #695, where the present driven position of the front lens group 1 in infocus condition is read by the position counter for counting the move-out amount $N_{AF}$ of the front lens group 1, and the subject distance D is set as $D=N_{AF}$, and thereafter returns to the flow of the power interrupt as shown in FIG. 6.

On the other hand, in the case where neither of the near/far focusing driving buttons 60a and 60b is operated, processing proceeds to step #700, where judgement is made on whether or not the flag AFMVF showing that the front lens group 1 is under driving has been set, and when the flag AFMVF has been set, the above-described subroutine of the front lens stopping as shown in FIG. 11 is executed in step #705. And then, after resetting the flag AFMVF in step #710, processing returns to the flow of the power interrupt as shown in FIG. 6 through step #695. When the flag AFMVF has not been set, processing immediately returns to the flow of the power interrupt as shown in FIG. 6 through step #695.

Meanwhile, in the case where the flag FZMF showing the focusing mode by the zooming lens components 2a and 2b has been set in step #655, assuming the set mode to be the focusing mode by the zooming lens components 2a and 2b, it is judged in step #715 whether or not focusing operation is performed in the direction of infinity. In the case of the direction of infinity as a result that the far focusing driving button 60b is operated, processing proceeds to step #720, where the motor drive command signal is sent to the motor controlling circuit 18 to move-in the zooming lens components 2a and 2b, and also the velocity command signal for setting the drive velocity of the zooming lens components 2a and 2b to the lowest velocity $V_1$ is sent to the velocity controlling circuit 19. When focusing operation is not performed in the direction of infinity, it is judged in step #725 whether or not focusing operation is performed in the near-side direction (in the direction near the video camera body). In the case of the near-side direction as a result that the near focusing driving button 60a is operated, processing proceeds to step #730, where the motor drive command signal for moving-out the zooming lens components 2a and 2b is sent to the motor controlling circuit 18, and also the velocity command signal for setting the drive velocity to the lowest velocity $V_1$ is sent to the velocity controlling circuit 19.

After preventing the subroutine of the zooming lens stopping due to the counter interrupt for the zooming lens components 2a and 2b from being executed by setting the moving amount of the zooming lens components 2a and 2b to $K_{TZ}$ in step #735, processing proceeds to step #740, where the flag ZMVF showing that the zooming lens components 2a and 2b are under driving is set, and returns to the flow of the power interrupt as shown in FIG. 6.

On the other hand, when neither of the near/far focusing driving buttons 60a and 60b is operated, processing proceeds to step #745, where judgment is made on whether or not the flag ZMVF showing that the zooming lens components 2a and 2b are under driving has been set. When the flag ZMVF has been set, assuming that the zooming lens components 2a and 2b are under driving, processing proceeds to step #750, where the above-described subroutine of the zooming lens stopping is executed according to the flowchart of FIG. 15. In the following step #755, the flag ZMVF is reset, and processing returns to the flow of the power interrupt as shown in FIG. 6. When the flag ZMVF has not been set in step #745, processing returns directly to the flow of the power interrupt as shown in FIG. 6.

Figure 19:
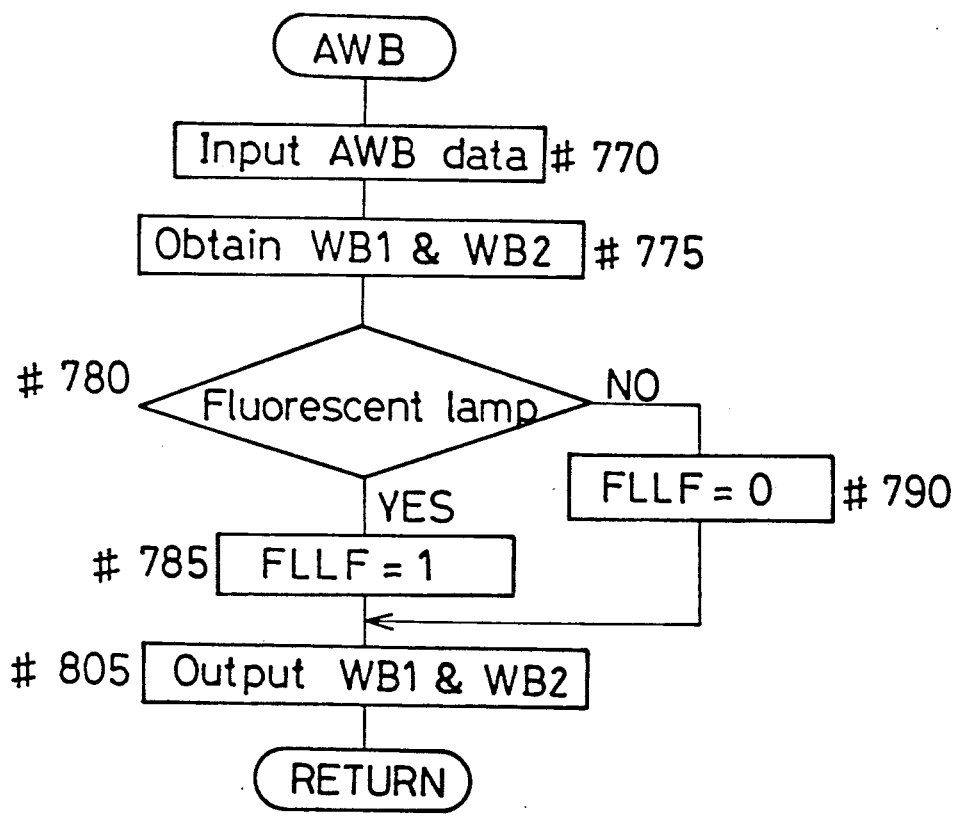
FIG. 19 is a flowchart showing a white balance adjustment subroutine.

As described above, the focusing subroutine is executed in step #50, thereafter processing proceeds to step #55, where the subroutine of white balance adjustment as shown in FIG. 19 is executed.

First, in step #770, measured output from the white balance sensor 40, i.e., digital data of B/R and G/R is read in, and in the subsequent step #775, data WB1 (signal for compensating the amplitude of the R-Y signal) and WB2 (signal for compensating the amplitude of the B-Y signal) for white balance adjustment are obtained from an ROM table inside the micro-computer 10 by setting the digital data B/R as an address. Then, in step #780, it is judged from the date B/R and G/R whether or not the light source is a fluorescent lamp, namely, whether or not B/R<G/R is satisfied. In the case of the fluorescent lamp (B/R<G/R), a flag FLLF showing that the light source is the fluorescent lamp is set in step #785. In the contrary case, the flag FLLF is reset in step #790. Thereafter, the data WB1 and WB2 for white balance adjustment set as the white balance adjustment signals are sent to the R-Y and B-Y variable gain controlling circuits 37 and 38 respectively through the D/A converter 39, and processing returns to the flow of the power interrupt as shown in FIG. 6.

The subroutine of the white balance adjustment is thus executed in step #55 and thereafter processing proceeds to step #60, where an AE subroutine is executed.

Figure 20:
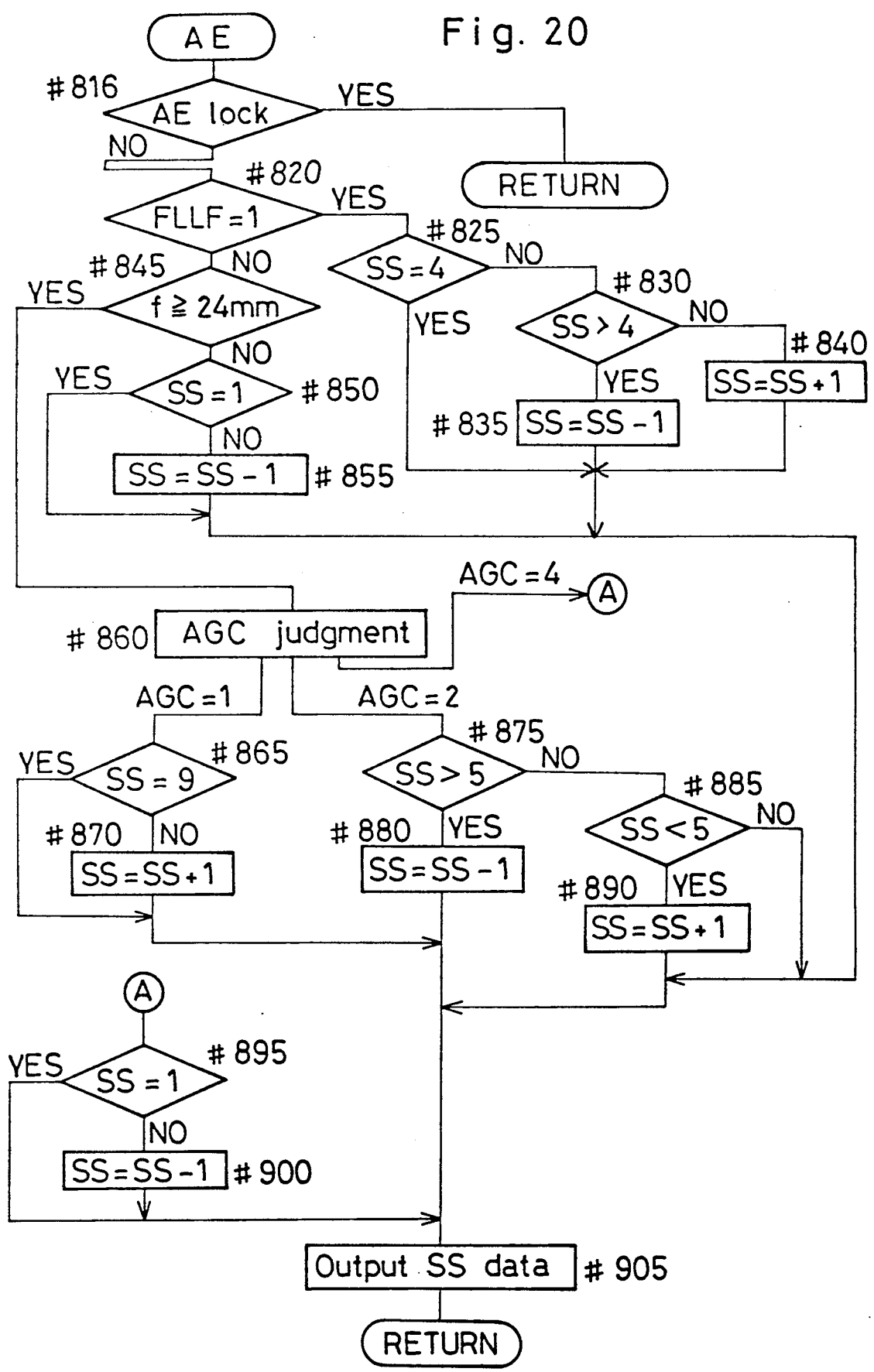
FIG. 20 is a flowchart showing an AE subroutine.

Referring to the flowchart of the AE subroutine as shown in FIG. 20, first, in step #816, by judging whether or not the AE locking switch 57 is turned on, judgment is made on whether the AE lock signal is inputted into the micro-computer 10 or not. When AE lock is performed (the AE locking switch 57 is in the ON state), processing returns directly to the flow of the power interrupt as shown in FIG. 6. On the contrary, when AE lock is not performed, processing proceeds to step #820, where it is judged whether or not the flag FLLF showing that the light source is the fluorescent lamp has been set. When the flag FLLF has been set, processing proceeds to step #825, where judgment is made on whether or not the shutter speed has been set as SS=4 as shown on Table 1. Here, the reason that the standard for judging the shutter speed under the fluorescent lamp is put on SS=4 is that the subject is intended to be exposed as properly as possible even if frequency of the power supply is either 50 HZ or 60 HZ. When the judgment results in SS=4 in step #825, processing immediately proceeds to step #905, where the shutter speed command signal of SS=4 is sent out, returning to the flow of the power interrupt as shown in FIG. 6. The shutter speed command signal and the white balance adjustment signal are outputted from the micro-computer 10 without synchronizing with a perpendicular synchronous signal of the image forming system, but latched in synchronism with the perpendicular synchronous signal on the shutter speed controlling circuit 51 and the R-Y and B-Y variable gain controlling circuits 37 and 38 which receive the signals outputted from the micro-computer 10.

On the other hand when SS=4 has not been set, processing proceeds to step #830, where judgment is made on whether SS>4 is satisfied at present or not. In the case of SS>4, SS=SS−1 (the shutter speed is reduced from the present one by 1 rank) is set. In the case of SS<4, SS=SS+1 (the shutter speed is raised by 1 rank) is set. In the case where the shutter speed is varied without variation in luminance, the diaphragm must be controlled so as to adjust the exposure in the opposite direction (that is, if the shutter speed is made higher, the diaphragm aperture is opened), however, the exposure adjustment by the diaphragm is delayed at least by 1 frame (1/60 second). This is the reason why the immediate setting of SS=4 is not performed when the shutter speed has not been set as SS=4. Especially, when the shutter speed varies by a large amount, it requires a long time to make the diaphragm stable, so proper exposure becomes difficult to be obtained. Therefore, it is necessary to vary the shutter speed gradually in the fractionizing manner. For example, the flow of the shutter speed setting may be executed many times compared with the other flows. After setting of the shutter speed, processing proceeds to step #905, where the shutter speed command signal is outputted corresponding to the set shutter speed, returning to the flow of the power interrupt as shown in FIG. 6.

Next, in step #820, when the judgment results in that the flag FLLF has not been set, processing proceeds to step #845, where it is judged whether or not the focal length f is not less than 24 mm. Since the ½ inch type CCD is used in the present embodiment, f=24 mm is almost equivalent to f=135 mm in a 35 mm camera format. Therefore, as described later, in the case of f>24 mm, the shutter speed as high as possible corresponding to the brightness of the subject in order to prevent the blurring of the image from occurring. In the case of f<24 mm, it is judged in step #850 whether or not the shutter speed has been set as SS=1. If SS=1 is not satisfied, the shutter speed is reduced from the present shutter speed by 1 rank (SS=SS−1) in step #855 and thereafter processing proceeds to step #905. If SS=1, processing immediately proceeds to the step #905. After the step #905, processing returns to the flow of the power interrupt as shown in FIG. 6. Meantime, when the focal length f is not less than 24 mm, it is judged in step #860 whether the amplitude of the AGC signal is 1, 2 or 4. If the amplitude of AGC=4, the shutter speed is designed to be set as SS=1. The shutter speed is set as SS=5 if the amplitude of AGC=2, and SS=9 is set if the amplitude of AGC=1. For this purpose, if the amplitude of AGC=1, processing proceeds to step #865, where judgment is made on whether or not SS=9 has been set. After increasing the present shutter speed by 1 rank (SS=SS+1) if SS=9 has not been set, or immediately if SS=9, processing proceeds to the flow of the power interrupt as shown in FIG. 6 through step #905. If the amplitude of AGC=2, processing proceeds to step #875, where judgment is made on whether or not SS>5 is satisfied. If SS>5, SS=SS−1 is set in step #880, while if SS>5 has not been set, it is judged in step #885 whether or not SS<5 is satisfied. After setting the shutter speed from the present shutter speed SS to SS+1 if SS<5, or immediately if SS<5 has not been set (i.e., SS=5), processing returns to the flow of the power interrupt as shown in FIG. 6 through step #905. In the case of the amplitude of AGC=4, processing proceeds to step #895, where judgment is made on whether or not SS=1 has been set. After setting the shutter speed from the present shutter speed SS to SS−1 in step #900 if SS=1 has not been set, or immediately if SS=1, processing returns to the flow of the power interrupt as shown in FIG. 6 through step #905. FIG. 21 is a program diagram showing the relation between the AGC signal and the shutter speed. As appreciated from FIG. 21, in the case where the AGC signal has been varied, the shutter speed is gradually varied, that is, the variable SS is changed one by one. This is because, as explained in the above-mentioned process of the step #830, the diaphragm control can not be performed in response to the rapid change in the shutter speed and is delayed at least by 1/60 second.

As described above, the AE subroutine is executed in step #60. Next, description will be made for the subroutine of the zooming mode in step #65 referring to FIG. 22.

First, it is judged in step #930 whether or not the flag FZMF showing the focusing mode by the zooming lens components 2a and 2b has been set. When the flag FZMF has been set, processing directly returns to the flow of the power interrupt as shown in FIG. 6. This means that the zooming control is performed only in the zooming range (the focal length of 9 through 54 mm), and inhibited in the macro range. Meantime, when the flag FZMF has not been set, processing proceeds to step #935, where the subroutine of zooming judgment which judges whether the set mode is the automatic program mode or the power zooming mode is executed.

In the subroutine of the zooming judgment as shown in FIG. 23, first, it is judged in step #955 whether or not the automatic/power zooming changing-over switch 53 has been turned on. When the switch 53 is not in the ON state, a flag SAPZF showing that the automatic/power zooming changing-over switch 53 has been turned on is reset in step #965, and processing returns to the flow as shown in FIG. 22. On the other hand, when the switch 53 has been turned on, processing proceeds to step #960, where judgment is made on whether or not the flag SAPZF showing the ON state of the switch 53 has been set. When the flag SAPZF has been set, assuming that the automatic/power zooming changing-over switch 53 continues to be in the ON state, processing returns to the flow as shown in FIG. 22. When the flag SAPZF has not been set, it is judged in step #970 whether or not the flag APZF showing the APZ mode is in the set state at present. When the flag APZF has been set (i.e., the APZ mode), this flag APZF is reset to set the power zooming mode in step #980. When the flag APZF has not been set, after setting the flag APZF and the flag SAPZF in steps #975 and #985, respectively, processing returns to the flow as shown in FIG. 22.

On completing the zooming judgment, it is judged in step #940 whether or not the flag APZF has been set. When the flag APZF has been set, processing proceeds to step #945 to execute the subroutine of the APZ mode. While processing proceeds to step #950 to execute the subroutine of the power zooming mode when the flag APZF has not been set.

Figure 24:
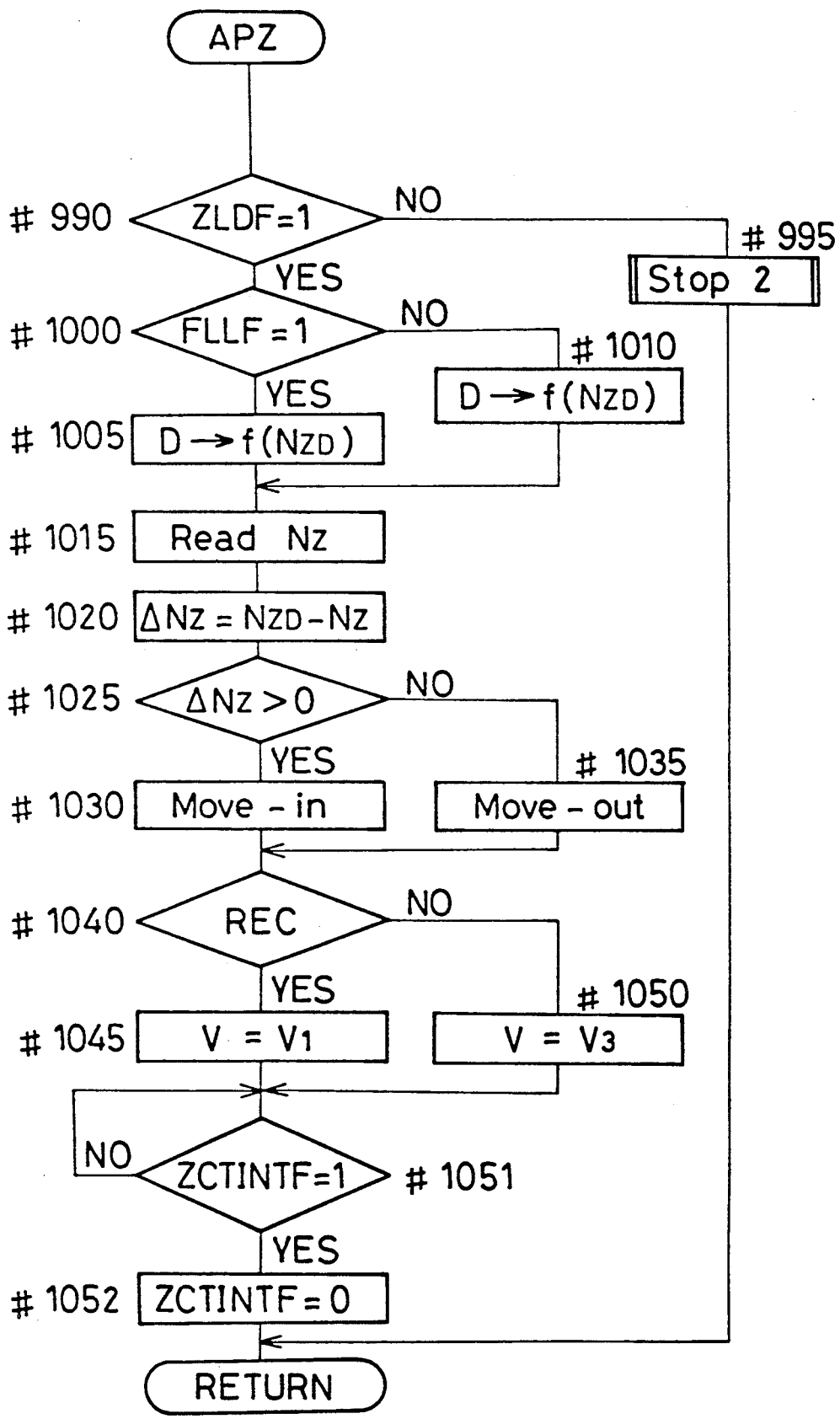
FIG. 24 is a flowchart showing a subroutine of an automatic program zooming mode.

Next, description will be made for the subroutine of the APZ mode referring to FIG. 24. In step #990, it is judged whether or not the flag ZLDF showing that the zooming control is inhibited has been set. When the flag ZLDF has not been set (i.e., the subject is largely in out of focus condition so that the zooming control is inhibited), after executing the subroutine of the stopping of the zooming lens components 2a and 2b as shown in FIG. 15, processing immediately returns to the flow of the power interrupt as shown in FIG. 6.

Figure 25:
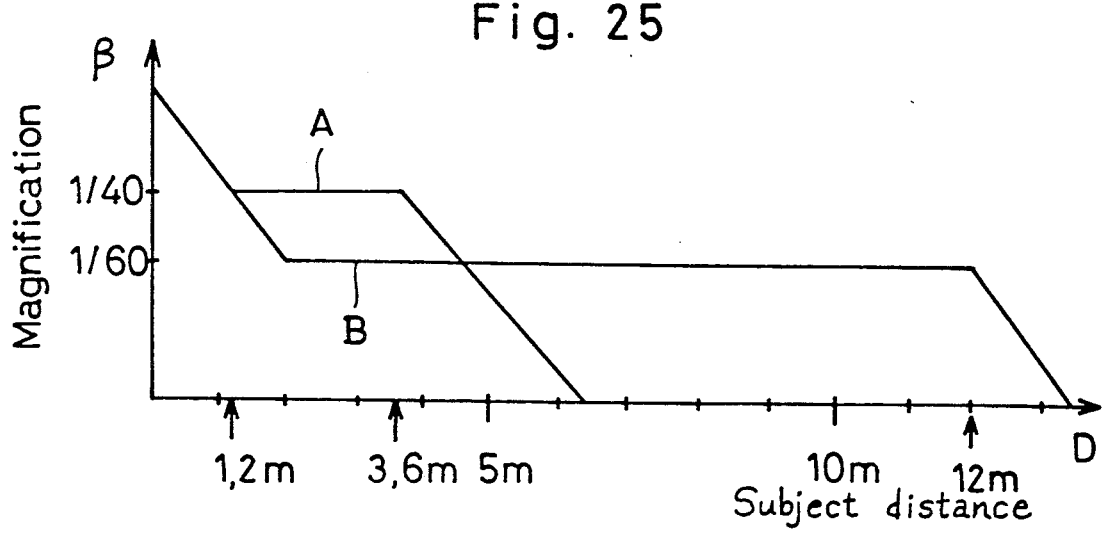
FIG. 25 is a program diagram regarding FIG. 24.

If the flag ZLDF has been set (i.e., the subject is not largely in out of focus condition so that the zooming control is permitted), processing proceeds to step #1000, where judgment is made on whether the flag FLLF showing that the light source is the fluorescent lamp has been set. When the flag FLLF has been set (indoors), in step #1005, the zooming control is set so as to be performed based on a program diagram A of FIG. 25 showing the relation between the subject distance and the magnification (focal length). If the flag FLLF has not been set (outdoors), in step #1010, the zooming control is set so as to be performed based on a program diagram B showing the relation between the subject distance and the magnification. Here, referring to the program diagram A, assuming that such an indoor photographing situation that, for example, a baby tends to be photographed in the whole image plane is frequently demanded, the magnification is kept constant ($\beta = 1/40$ in a 35 mm camera format) at a short subject distance from 1.2 m to 3.6 m, and otherwise varied corresponding to the subject distance. Here, the range where the magnification is kept constant is set to the subject distance from 1.2 m to 3.6 m. This is because the subject distance set in the above-mentioned indoor photographing scene is considered to be up to slightly over 3 m and the above-mentioned magnification ($\beta = 1/40$) is judged to be too large for photographing in a spacious room such as a gymnasium. On the other hand, referring to the program diagram B, assuming that such an outdoor photographing situation that the whole body of a child or the upper half body of an adult is frequently demanded, the magnification is kept constant ($\beta = 1/60$ in the 35 mm camera format) at the subject distance from 2 m through 12 m, and otherwise varied corresponding to the subject distance in a manner that it is made higher at a short subject distance and made lower at a long subject distance. Thus, the magnification is automatically decided from the subject distance D on the basis of the above-described program diagrams A and B in steps #1005 and #1010 respectively and the moving amount $N_{ZD}$ of the zooming lens components 2a and 2b from the shortest focal length condition is calculated from the focal length corresponding to the decided magnification and the subject distance. Thereafter, in the following step #1015, the present driven position of the zooming lens components 2a and 2b from the shortest focal length condition, that is, the count value $N_Z$ of the position counter for the zooming lens components 2a and 2b is inputted into the micro-computer 10. Subsequently, after calculating the difference $\Delta N_Z$ between the calculated moving amount $N_{ZD}$ and the present driven position $N_Z$ in step #1020, judgment is made in step #1025 as to the sign of the subtracted value $\Delta N_Z$. In the case of positive, processing proceeds to step #1030, where the motor drive command signal is sent out to the motor controlling circuit 18 to move-in the zooming lens components 2a and 2b. On the contrary, in the case of negative, processing proceeds to step #1035, where the motor drive command signal is sent out to the motor controlling circuit 18 to move-out the zooming lens components 2a and 2b. And then, in the next step #1040, whether or not recording is being performed at present is judged by whether or not the REC/standby mode changing-over switch 55 has been turned on. In the case of under recording, in step #1045, the velocity command signal is sent to the velocity controlling circuit 19 to set the drive velocity of the zooming lens components 2a and 2b to the lowest velocity $V_1$. In the case of not under recording, in step #1050, the velocity command signal is sent out to the velocity controlling circuit 19 to set the drive velocity of the zooming lens components 2a and 2b to $V_3$.

When the move-in or move-out drive of the zooming lens components 2a and 2b are started as described above and thereby the drive pulses are sent out from the drive detection device 20, the above-described counter interrupt for the zooming lens components 2a and 2b is executed to reach the decided magnification, thereafter processing returns to the flow of the power interrupt as shown in FIG. 6 through steps #1051 and #1052.

Figure 26:
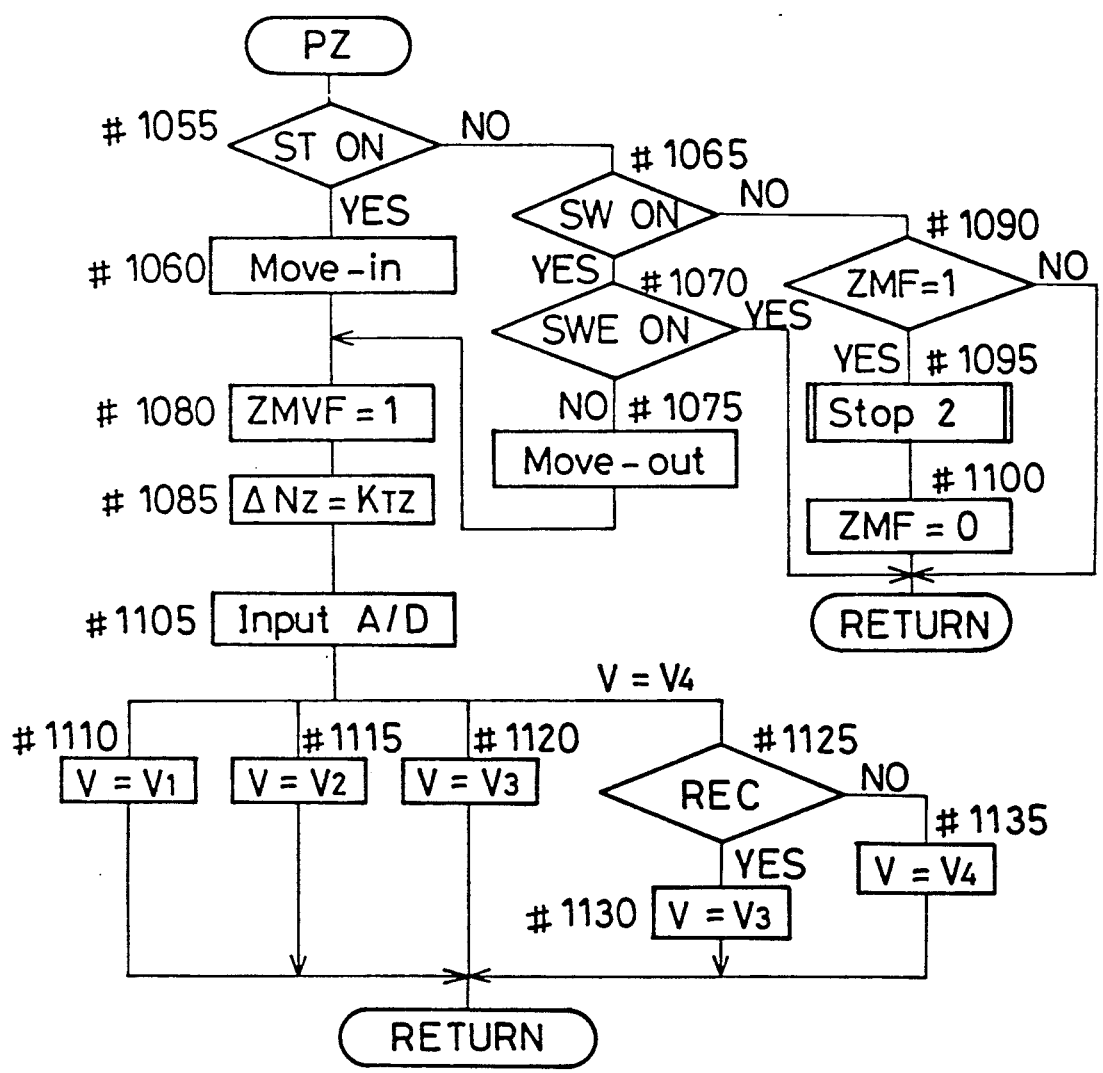
FIG. 26 is a flowchart showing a subroutine of a power zooming mode.

Next, description will be made for the subroutine of the power zooming mode referring to FIG. 26. First, it is judged in step #1055 whether or not the TELE zooming driving button 58b has been operated. When the button 58b is in the ON state, assuming that the zooming operation to the TELE side (toward the longest focal length condition) is selected, the motor drive command signal is sent out to the motor controlling circuit 18 to move-in the zooming lens components 2a and 2b in step #1060. When the button 58b is in the OFF state, processing proceeds to step #1065, where judgment is made on whether or not the WIDE zooming driving button 58a has been turned on. When the button 58a is in the ON state, assuming that the zooming operation to the WIDE side (toward the shortest focal length condition) is selected, further in step #1070, it is judged whether or not the zooming lens components 2a and 2b are positioned at the shortest focal length condition based on the state of the shortest focal length condition detecting switch 62. If the zooming lens components 2a and 2b are at the shortest focal length condition, processing immediately returns to the flow of the power interrupt as shown in FIG. 6, and if not (the shortest focal length condition detecting switch 62 is in the OFF state), processing proceeds to step #1075, where the motor drive command signal is sent out to the motor controlling circuit 18 to move-out the zooming lens components 2a and 2b. Subsequently, after setting the flag ZMVF showing that the zooming lens components 2a and 2b are under driving in step #1080, the moving amount $\Delta N_Z$ thereof is set to $K_{TZ}$. Thereafter, in step #1105, an analog setting signal in correspondence to the set position of the volume 59 for varying the zooming velocity is inputted and converted into a digital one, and the drive velocity is decided correspondingly thereto. That is to say, the velocity command signal is sent out to the velocity controlling circuit 19 so that the drive velocity may be set as $V_1$ or $V_2$ or $V_3$ in step #1110 or #1115 or #1120 respectively in response to the instructions of the setting signal. Further, when the velocity $V_4$ is instructed by the setting signal, first, it is judged in step #1125 whether or not recording is being performed at present. If under recording, the velocity command signal is sent out to the velocity controlling circuit 19 to forcibly set the drive velocity to $V_3$ for prevention of rapid variation in the image angle in step #1130. If not under recording, the velocity command signal is sent out to the velocity controlling circuit 19 to set the drive velocity as $V_4$ in step #1135. Thereafter, processing returns to the flow of the power interrupt as shown in FIG. 6. When neither of the WIDE/TELE zooming driving buttons 58a and 58b has been turned on, processing proceeds to step #1090, where judgment is made on whether or not the flag ZMVF showing that the zooming lens components 2a and 2b are under driving has been set. When the flag ZMVF has not been set, processing immediately returns to the flow of the power interrupt as shown in FIG. 6. When the flag ZMVF has been set, the subroutine for stopping the zooming lens components 2a and 2b as shown in FIG. 15 is executed in step #1095, the flag ZMVF is reset in step #1100, and thereafter processing returns to the flow of the power interrupt as shown in FIG. 6.

After the subroutine of the zooming mode setting is thus executed in step #65, the subroutine of display is executed in step #70 in accordance with the flowchart as shown in FIG. 27.

In the subroutine of the display, the signal displaying the shutter speed determined in the above-described each flow, the signal displaying the presence/absence of the APZ mode, and the signal displaying the presence/absence of the under-recording are sent out to the display apparatus 52 in steps #1150, #1155 and #1160 respectively, and thereafter processing returns to the flow of the power interrupt as shown in FIG. 6.

After the subroutine of the display is executed in step #70 as described above, processing proceeds to step #72, where judgment is made on whether or not the power switch 57 is in the ON state. When the power switch 57 has been continuously turned on, processing repeats the flow from step #25 again, but when the switch 57 is in the OFF state, supply of the power supply voltage to the whole video camera is cut off in step #74 for completion of the execution of the power interrupt.

Furthermore, in the present embodiment, the judgment on whether the light source is the fluorescent lamp or not is made by the color temperatures (B/R, G/R), however, detection of ripples may be employed for this judgment.

According to the present embodiment, the changeover between the program diagrams A and B is performed by whether or not the flag FLLF has been set (that is, indoors or outdoors), however, this changeover may be performed by operating the WIDE/TELE zooming driving buttons 58a and 58b.

To put it concretely, the subroutine of the APZ mode is replaced with the flowchart as shown in FIG. 28. First, in step #989, the subroutine of the mode judgment is executed according to the flowchart as shown in FIG. 29. In step #989-1, judgment is made on whether or not the TELE zooming driving button 58b has been turned on. In the case of the turn-on, a mode flag MODF is set in step #989-2 to return to the flow as shown in FIG. 28. In the case of the turn-off of the TELE zooming button 58b, processing proceeds to step #989-3, where judgment is made on whether or not the WIDE zooming driving button 58a has been turned on. In the case of the turn-off, processing immediately returns to the flow as shown in FIG. 28, while in the case of the turn-on of the WIDE zooming driving button 58a, processing proceeds to step #989-4, where the mode flag MODF is reset to return to the flow as shown in FIG. 28. Subsequently, in step #1000-1 of the flow as shown in FIG. 28, judgment is made on whether or not the mode flag MODF has been set. If the flag MODF has been set, photographing operation is assumed to be performed indoors, but if the flag MODF has not been set, it is assumed to be performed outdoors.

Furthermore, in the present embodiment, the front lens group 1 performs the focusing operation in the normal focusing range, however, an inner focus lens or a rear focus lens may be employed for the present invention. In this case, since the moving amount of the focusing lens from the infinity position changes corresponding to the focal length of the lens system, the subject distance is calculated based on the positions of the focusing lens and the zooming lens.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A camera comprising:
a taking lens having a zoom lens system;
zoom lens driving means for performing a zooming operation by driving the taking lens;
photographing scene judging means for judging a kind of light source which is illuminating a subject to be photographed based on color temperature; and
controlling means for controlling the zoom lens driving means by restricting a focal length range to be used by the zoom lens system in response to the kind of light source judged by the photographing scene judging means.

2. A camera as claimed in claim 1, further comprising subject distance detecting means for detecting subject distance, and in which the controlling means determines a focal length to be used in response to a subject distance detected by the subject distance detecting means, the determined focal length being restricted within the zooming range responding to the photographing scene.

3. A camera comprising:
a taking lens having a zoom lens system;
zoom lens driving means for performing a zooming operation by driving the taking lens;
first focal length zone restricting means for restricting to a first zone of focal lengths to be possibly taken by the taking lens;
second focal length zone restricting means for restricting to a second zone of focal lengths to be possibly taken by the zoom lens system different from the first zone of focal lengths;
photographing scene judging means for judging a kind of light source which is illuminating a subject to be photographed based on color temperature; and
controlling means for controlling the zoom lens driving means within either the first focal length zone or the second focal length zone selected in response to the kind of light source judged by the photographing scene judging means.

4. A camera as claimed in claim 3, further comprising subject distance detecting means for detecting subject distance, and in which the controlling means determines one focal length within either the first focal length zone or the second focal length zone selected by a subject distance detected by the subject distance detecting means for controlling the zoom lens driving means.

5. A camera comprising:
a taking lens having a zoom lens system;
zoom lens driving means for performing a zooming operation by driving the taking lens;
subject change detecting means;
subject distance detecting means;
focal length determining means for determining a focal length to be used corresponding to a distance detected by the distance detecting means; and
controlling means for controlling the zoom lens driving means on the basis of the focal length determined by the focal length determining means, the controlling means being inhibited from controlling the zoom lens driving means on the basis thereof when it is detected by the subject change detecting means that the state of a subject is largely changed.

6. A camera as claimed in claim 5, in which the subject change detecting means is means for calculating a defocus amount.

7. A camera as claimed in claim 5, further comprising zooming velocity varying means for varying a velocity of the zooming operation by controlling the zoom lens driving means.

8. A camera as claimed in claim 7, in which the zoom lens system has lens constitution where the subject falls into out of focus condition due to focal length variation.

9. A camera comprising:
a taking lens constituted with a first lens group as a front lens and a second lens group positioned behind the first lens group;
first lens driving means for driving the first lens group;
second lens driving means for driving the second lens group;
focus condition detecting means for detecting a focus condition of the taking lens;
zooming operation controlling means for controlling a zooming operation of the taking lens; and
controlling means which controls, in a first subject distance range, the first lens driving means on the basis of the focus condition detected by the focus condition detecting means for a focusing operation and controls the second lens driving means in co-operation with the zooming operation controlling means for a zooming operation, while controlling, in a second subject distance range positioned on nearer side than the first subject distance range, the second lens driving means on the basis of the detected focus condition for the focusing operation, the controlling means further storing a focal length of the taking lens when the subject distance is shifted to the second subject distance range from the first subject distance range, and controlling the second lens driving means so that the taking lens has the stored focal length while controlling the first lens driving means on the basis of the detected focus condition when the subject distance is returned to the first subject distance range from the second subject distance range.

10. A camera comprising:
a taking lens constituted with a first lens group and a second lens group;
first lens driving means for driving the first lens group;
second lens driving means for driving the second lens group;
focus condition detecting means for detecting a focus condition;
zooming velocity setting means for setting a velocity of a zooming operation; and
controlling means which controls, in a first subject distance range, the first lens driving means on the basis of the focus condition detected by the focus condition detecting means for a focusing operation and controls the second lens driving means on the basis of the velocity set by the zooming velocity setting means for the zooming operation, the controlling means controlling, in a second subject distance range, the second lens driving means on the basis of the detected focus condition for the focusing operation and inhibiting control of the zooming velocity by the zooming velocity setting means.

11. A camera as claimed in claim 10, in which the first lens group is a front lens and the second lens group is positioned behind the first lens group, and in which the controlling means controls the second lens driving means on the basis of the focus condition detected by the focus condition detecting means for the focusing operation when the first lens group reaches a nearest subject distance in the focusing operation.

12. A camera as claimed in claim 10, further comprising recording judging means for judging whether or not a subject is being recorded on a predetermined recording medium, and wherein the controlling means further controls the second lens driving means so as to vary the zooming velocity in response to whether or not a subject is being recorded.

13. A camera comprising:
a taking lens having a zoom lens system;
zoom lens driving means for performing a zooming operation by driving the taking lens;
focus condition detecting means;
zooming velocity varying means for varying a velocity of the zooming operation for controlling the zoom lens driving means;
recording judging means for judging whether or not a subject is being recorded on a predetermined recording medium; and
controlling means for controlling the zoom lens driving means so as to vary the zooming velocity by the zooming velocity varying means in response to whether or not a subject is being recorded.

14. A camera as claimed in claim 13, in which the controlling means restricts a range of the zooming velocity during recording.

15. A camera as claimed in claim 13, in which the controlling means includes a first zooming velocity range and a second zooming velocity range and selects either of them in response to whether or not a subject is being recorded.

16. A camera comprising:
a photo-taking lens capable of changing its focal length by means of shifting a zoom lens unit on an optical axis of the photo-taking lens;
judging means for judging the condition of a photographing scene;
detecting means for detecting a subject distance;
calculating means for calculating a focal length from the subject distance on the basis of a calculation program;

changing means for changing the calculation program according to the judged condition; and shifting means for automatically shifting the zoom lens unit toward the calculated focal length.

17. A camera as claimed in claim 16, wherein the judging means judges what kind of a light source illuminates a subject.

18. A camera comprising:
a photo-taking lens capable of changing its focal length by means of shifting a zoom lens unit on an optical axis of the photo-taking lens;
detecting means for detecting a subject distance;
calculating means for calculating a focal length from the subject distance in order to realize a predetermined magnification;
directing means for directing a zooming operation by a manual operation;
shifting means for, in a first mode, shifting the zoom lens unit in response to the operation of the directing means and for, in a second mode, shifting the zoom lens unit on the basis of the calculated focal length; and
restricting means for restricting a shifting range of the zoom lens unit only in the second mode.

19. A camera comprising:
a taking lens having a zoom lens system;
zoom lens driving means for performing a zooming operation by driving the taking lens;
photographing scene judging means for judging a kind of light source which is illuminating a subject to be photographed based on ripple; and
controlling means for controlling the zoom lens driving means by restricting a focal length range to be used by the zoom lens system in response to the kind of light source judged by the photographing scene judging means.

20. A camera as claimed in claim 19, further comprising subject distance detecting means for detecting subject distance, and in which the controlling means determines a focal length to be used in response to a subject distance detected by the subject distance detecting means, the determined focal length being restricted within the zooming range responding to the photographing scene.

21. A camera comprising:
a taking lens having a zoom lens system;
zoom lens driving means for performing a zooming operation by driving the taking lens;
first focal length zone restricting means for restricting to a first zone of focal lengths possibly taken by the taking lens;
second focal length zone restricting means for restricting a second zone of focal lengths possibly taken by the zoom lens system different from the first zone of focal lengths;
photographing scene judging means for judging a kind of light source which is illuminating a subject to be photographed based on ripple; and
controlling means for controlling the zoom lens driving means within either the first focal length zone or the second focal length zone selected in response to the kind of light source judged by the photographing scene judging means.

22. A camera as claimed in claim 21, further comprising subject distance detecting means for detecting subject distance, and in which the controlling means determines one focal length within either the first focal length zone or the second focal length zone selected by a subject distance detected by the subject distance detecting means for controlling the zoom lens driving means.

* * * * *

UNITED STATES PATENT AND TRADEMARK OFFICE
CERTIFICATE OF CORRECTION

PATENT NO. : 5,140,360

DATED : August 18, 1992

INVENTOR(S) : Takeya TSUKAMOTO et al

It is certified that error appears in the above-identified patent and that said Letters Patent is hereby corrected as shown below:

On the Title page, inventor, item [75], delete "Hasimoto" and insert -- Hashimoto --.

Signed and Sealed this

Seventh Day of September, 1993

Attest:

BRUCE LEHMAN

Attesting Officer

Commissioner of Patents and Trademarks